United States Patent
Alsup et al.

(10) Patent No.: US 9,727,341 B2
(45) Date of Patent: Aug. 8, 2017

(54) CONTROL FLOW IN A THREAD-BASED ENVIRONMENT WITHOUT BRANCHING

(71) Applicant: Samsung Electronics Co., Ltd., Suwon-si, Gyeonggi-do (KR)

(72) Inventors: Mitchell Alsup, Austin, TX (US); Yang Jiao, San Jose, CA (US); Boris Beylin, Palo Alto, CA (US); Maxim Lukyanov, Sunnyvale, CA (US); Alexander Grosul, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 325 days.

(21) Appl. No.: 14/458,165

(22) Filed: Aug. 12, 2014

(65) Prior Publication Data
US 2015/0324198 A1  Nov. 12, 2015

Related U.S. Application Data

(60) Provisional application No. 61/991,339, filed on May 9, 2014.

(51) Int. Cl.
*G06F 9/30* (2006.01)
*G06F 9/38* (2006.01)

(52) U.S. Cl.
CPC ........ *G06F 9/3851* (2013.01); *G06F 9/3009* (2013.01); *G06F 9/30021* (2013.01); *G06F 9/30058* (2013.01); *G06F 9/30069* (2013.01); *G06F 9/30145* (2013.01); *G06F 9/3887* (2013.01)

(58) Field of Classification Search
CPC .................................................... G06F 9/3851
See application file for complete search history.

(56) References Cited

U.S. PATENT DOCUMENTS

| | | | |
|---|---|---|---|
| 7,886,283 B2 | 2/2011 | Nacul et al. | |
| 8,159,491 B2 | 4/2012 | Capewell et al. | |
| 8,234,650 B1 | 7/2012 | Eppstein et al. | |
| 2012/0198425 A1* | 8/2012 | Eichenberger | G06F 8/456 717/140 |
| 2013/0198760 A1 | 8/2013 | Cuadra et al. | |
| 2014/0164737 A1* | 6/2014 | Collange | G06F 9/30072 712/205 |
| 2014/0181467 A1* | 6/2014 | Rogers | G06F 9/3887 712/22 |
| 2014/0181477 A1* | 6/2014 | Vaidya | G06F 9/30018 712/208 |

(Continued)

OTHER PUBLICATIONS

U.S. Non-Final Office Action for U.S. Appl. No. 14/458,158 dated Oct. 23, 2015.

(Continued)

*Primary Examiner* — William B Partridge
(74) *Attorney, Agent, or Firm* — Innovation Counsel LLP

(57) ABSTRACT

A method for computing in a thread-based environment provides manipulating an execution mask to enable and disable threads when executing multiple conditional function clauses for process instructions. Execution lanes are controlled based on execution participation for the process instructions for reducing resource consumption. Execution of particular one or more schedulable structures that include multiple process instructions are skipped based on the execution mask and activating instructions.

27 Claims, 20 Drawing Sheets

(56) References Cited

U.S. PATENT DOCUMENTS

2014/0184616 A1 7/2014 Gupta et al.
2015/0324228 A1 11/2015 Alsup et al.

OTHER PUBLICATIONS

U.S. Corrected Notice of Allowability for U.S. Appl. No. 14/458,158 dated Oct. 6, 2016.
U.S. Notice of Allowance for U.S. Appl. No. 14/458,158 dated Jun. 8, 2016.

* cited by examiner

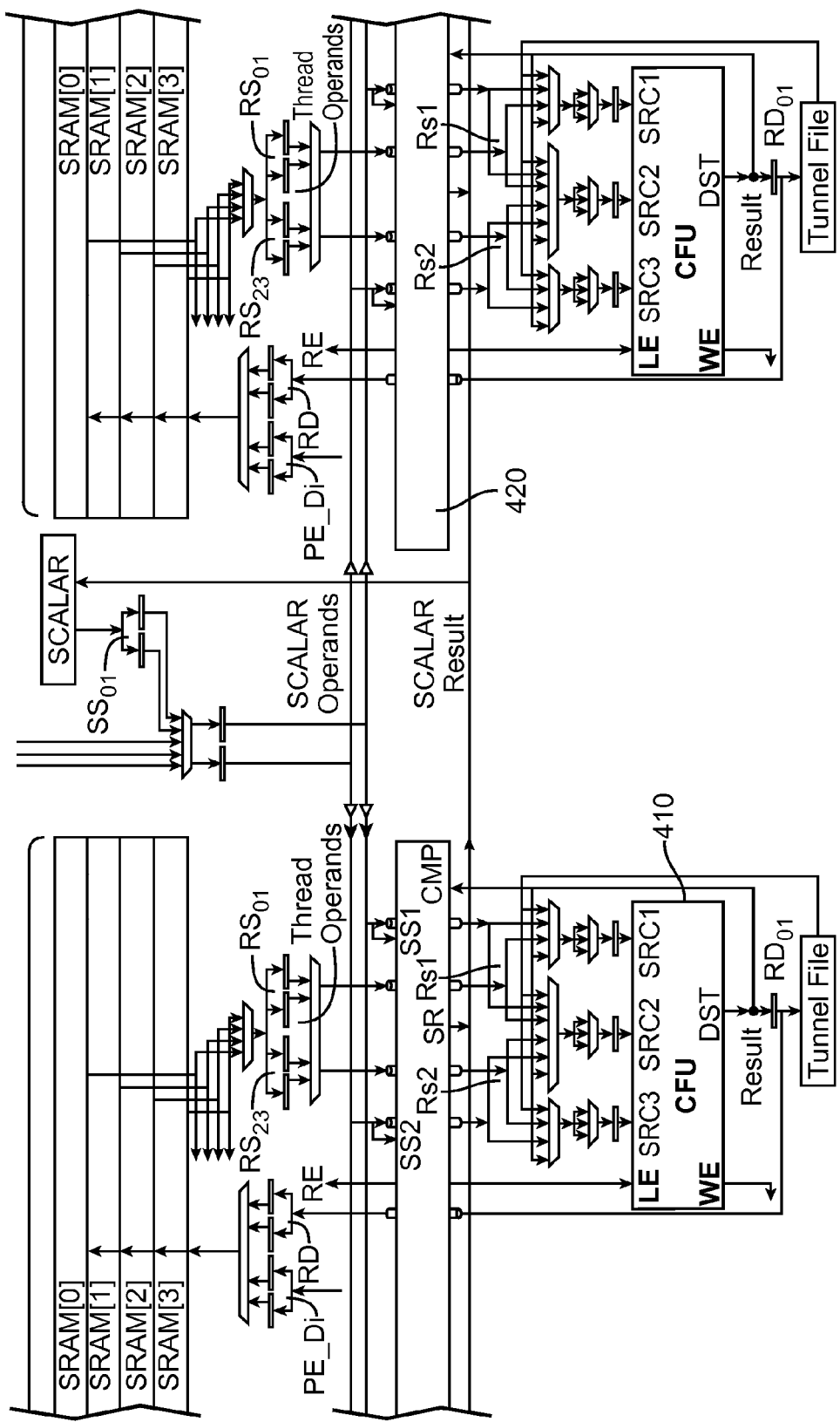
FIG. 4 (Cont. 1)

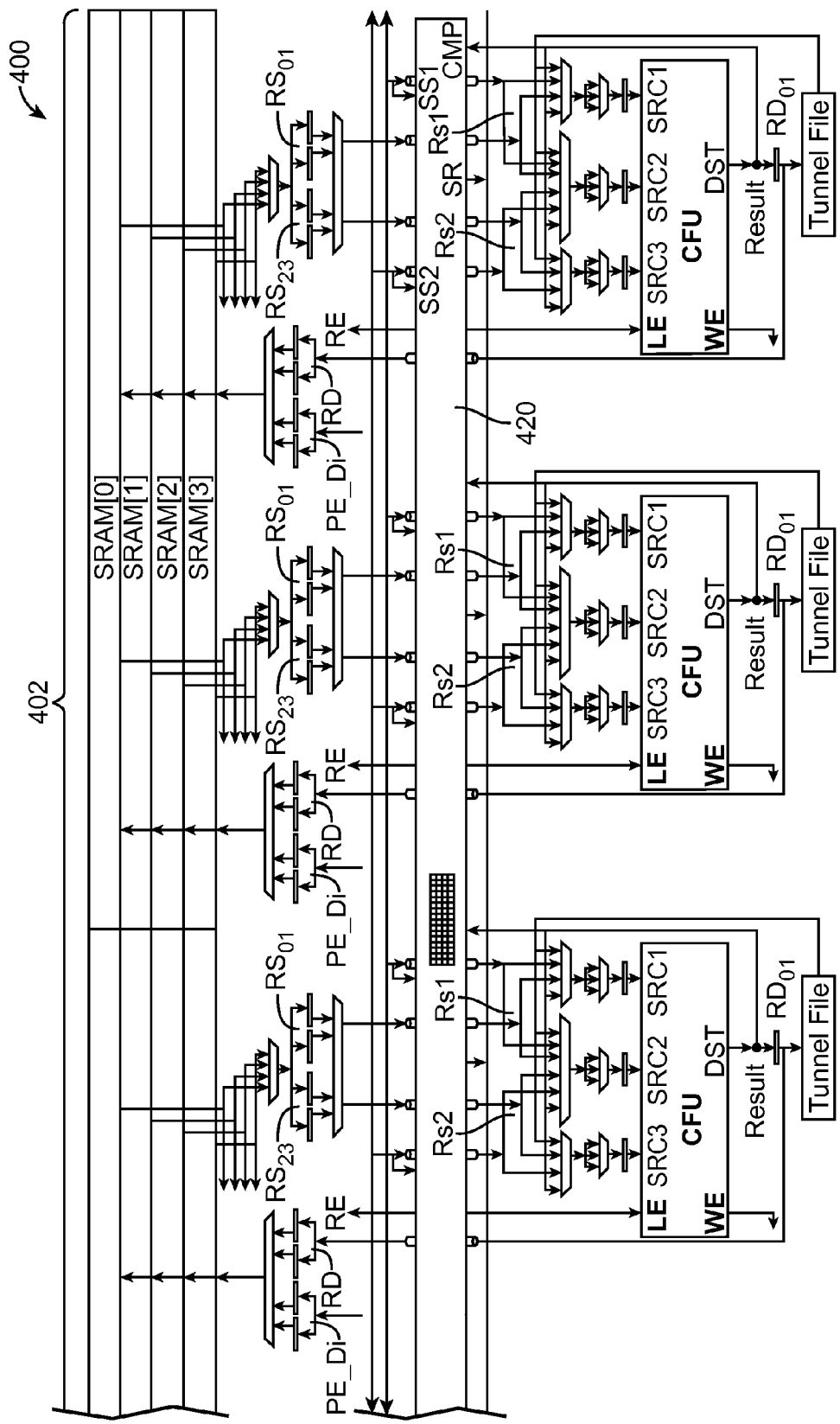
FIG. 4 (Cont. 2)

ial description read in conjunction with the accompanying drawings, in which:

CONTROL FLOW IN A THREAD-BASED ENVIRONMENT WITHOUT BRANCHING

CROSS-REFERENCE TO RELATED APPLICATIONS

This application claims the priority benefit of U.S. Provisional Patent Application Ser. No. 61/991,339, filed May 9, 2014, which is incorporated herein by reference in its entirety.

TECHNICAL FIELD

One or more embodiments generally relate to a single-instruction multiple-thread (SIMT) processing environments and, in particular, to controlling flow and execution of instructions for resource savings.

BACKGROUND

SIMT processors choose which instruction to execute almost every SIMT cycle. Each instruction identifies the resources that it requires, and when those resources are available the instruction becomes a candidate for execution. At each SIMT cycle a potentially different group of threads are selected to execute.

SUMMARY

One or more embodiments generally relate to controlling execution flow without executing one or more control flow transfer instructions. In one embodiment, a method provides for power savings in a thread-based environment. One embodiment includes manipulating an execution mask to enable and disable threads when executing a plurality of conditional function clauses for process instructions. In one embodiment, execution lanes are controlled based on execution participation for the process instructions for reducing power consumption. In one embodiment, execution of particular one or more schedulable structures that include a plurality of process instructions are skipped based on the execution mask and activating instructions.

In one embodiment, execution lanes are controlled based on execution participation for the process instructions for reducing power consumption. In one embodiment, execution of particular one or more schedulable structures that include a plurality of process instructions are skipped based on the execution mask and activating instructions.

In one embodiment, a graphics processor for an electronic device comprises one or more processing elements coupled to a memory device. In one embodiment, the one or more processing elements: manipulate an execution mask to enable and disable threads when executing a plurality of conditional function clauses for process instructions; control execution lanes based on execution participation for the process instructions for reducing power consumption; and skip execution of particular one or more schedulable structures that include a plurality of process instructions based on the execution mask and activating instructions.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
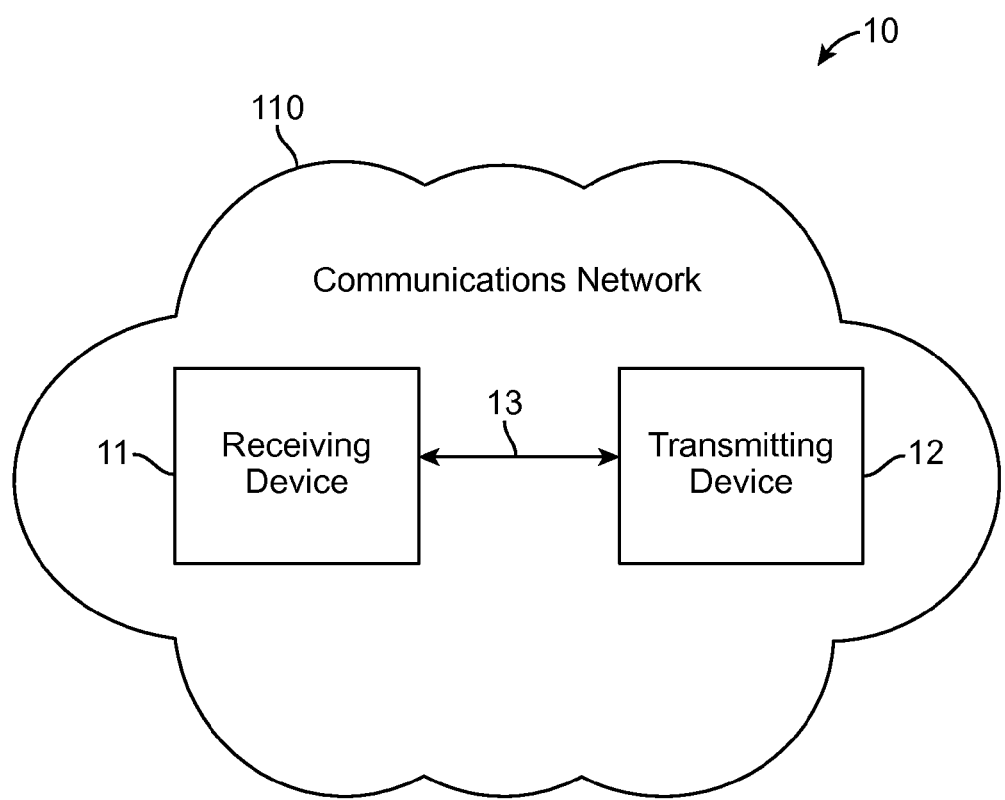
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide a means to organize multiple instructions into a schedulable structure referred to as a trace. In one embodiment, a trace is a region of code that contains a number of instructions with the following properties: a trace will not begin execution until specified events have occurred; a trace will not begin execution unit all required resources are available; and a trace once entered into execution, executes to completion. In one or more embodiments, the trace bundles a plurality of instructions into a single schedulable unit. The trace contains a header (e.g., a trace header). In one embodiment, the trace header includes a list of outstanding events that must complete before this trace can be scheduled. The trace header includes a list of resources that the multiple instructions in the trace need or require. When all needed/required resources are available, the trace becomes a candidate for execution. One candidate trace from a plurality can be scheduled into execution, and then a large plurality of instructions may execute such that no stalls will occur.

In one embodiment, the trace header is organized to simplify matching of resource requests to available resources, and the SIMT scheduling process. Because the trace runs to completion, the data-path may be augmented with a small low overhead tunnel register file. In one embodiment, results and operands may be stored in the tunnel register file for subsequent use within a trace, reducing the number of register file accesses. In one embodiment, the tunnel register file does not persist across trace boundaries and thus may be considered inexpensive with respect to context switching and SIMT scheduling. In one embodiment, the shader compiler may use the tunnel register file as a small repository and avoid many read and many write accesses to the much larger thread register file, which reduces power consumption.

One or more embodiments provide for graphical processing control flow of instructions (e.g., shader core instructions, etc.) without executing control flow transfer instructions for controlling graphics processing execution without changing a program counter. In one or more embodiments, an SIMT execution architecture environment bundles a number of threads to a management structure. All threads in the bundle execute the same instruction in lock step.

In one or more embodiment, a set of instructions are provided in the instruction set architecture that directly implement the semantics of high-level programming languages, with the specific purpose that these instructions may take "zero" time to execute. In one embodiment, the data-path contains an execution mask component configured for managing whether an instruction executes (or not). In one embodiment, compare instructions may directly manipulate the execution mask and a scalar register to provide IF-THEN-ELSE, and loop constructs from high level shader languages. In one or more embodiments, additional instructions manage the transitions between executing regions, such as the transition between a then clause and an else clause. In one embodiment, at each transition the execution mask is altered to reflect the desired high level shader language requirements.

In one embodiment, a method provides for power savings in a thread-based environment. One embodiment includes manipulating an execution mask to enable and disable threads when executing a plurality of conditional function clauses for process instructions. In one embodiment, execution lanes are controlled based on execution participation for the process instructions for reducing power consumption. In one embodiment, execution of particular one or more schedulable structures that include a plurality of process instructions are skipped based on the execution mask and activating instructions.

In one embodiment, a method provides for computing in an SIMT thread-based environment. One embodiment includes a means to manipulate an execution mask to enable and disable threads when executing a plurality of conditional statements on behalf of process instructions. Execution lanes are controlled based on an execution mask and a braid specifier from the instruction. Execution of schedulable structures include a plurality of process instructions. Process instructions can be skipped based on comparison instructions, activation instructions, and the execution mask.

One or more embodiments generally relate to controlling execution flow without executing one or more control flow transfer instructions. In one embodiment, a method provides for computing in a thread-based environment. One embodiment includes manipulating an execution mask to enable and disable threads when executing a plurality of instructions that exercise control over other instructions. Execution lanes are controlled under an execution mask to effect control flow semantics and to control power consumption. Instructions are bundled into schedulable structure which can be executed to completion once started under control of an execution mask.

In one embodiment a non-transitory computer-readable medium having instructions which when executed on a computer perform a method comprising: manipulating an execution mask to enable and disable threads when executing a plurality of conditional function clauses for process instructions. A plurality of process instructions can be rapidly skipped based the state of the execution mask.

In one embodiment, one or more processing elements: manipulate an execution mask to enable and disable threads when executing a plurality of conditional statements containing process instructions.

An SIMT processor has a multiplicity of threads bound to a single point of control. Each thread can process a limited number (e.g., four) of units of work. Each unit of work is controlled by a bit from an execution mask. Control flow is performed by manipulating the execution mask. Compare instructions directly manipulate the execution mask. Most of the time, control flow transfer instructions are not placed in the instruction stream.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
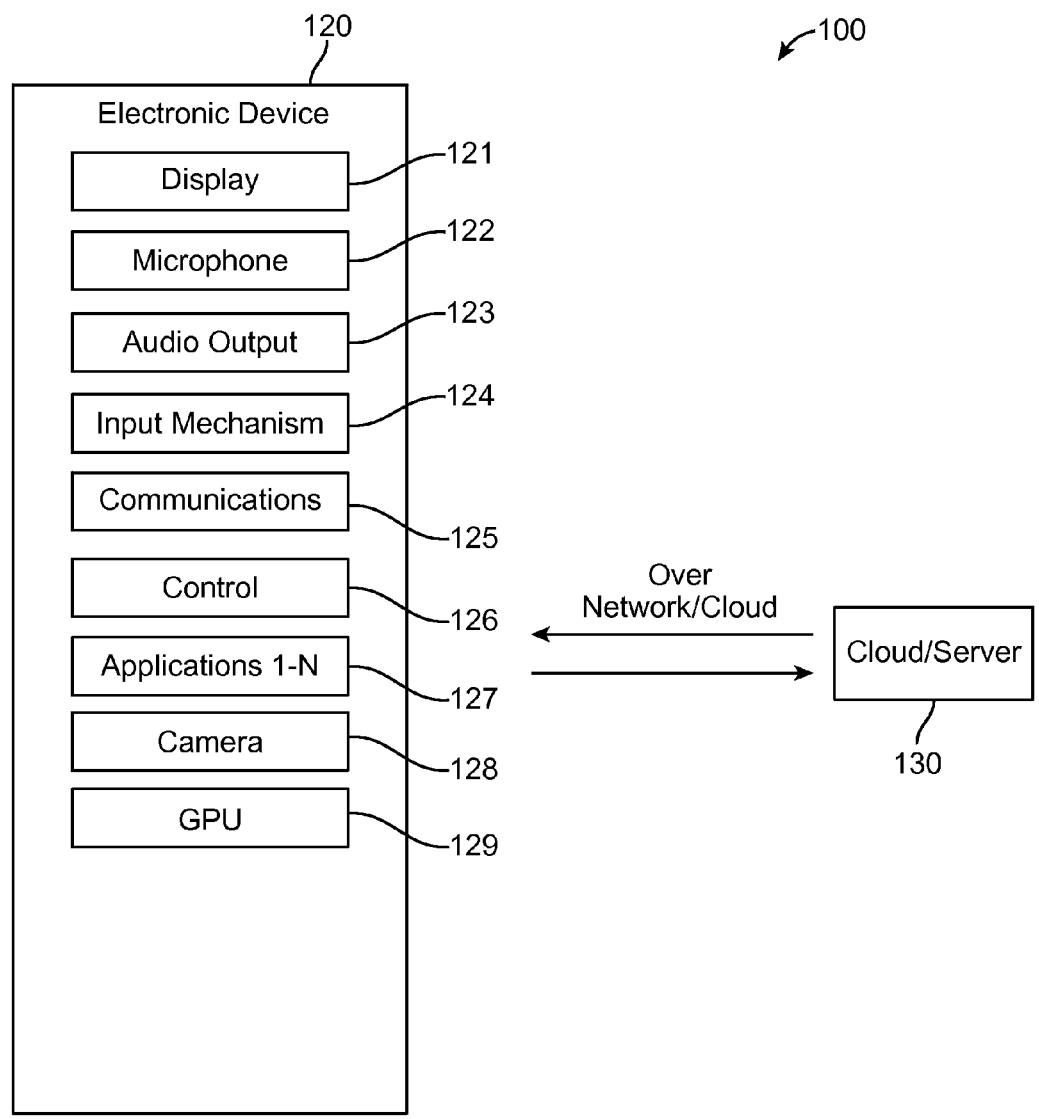
FIG. 2 shows a block diagram of architecture for a system including a mobile device including a graphical processing unit (GPU) module, according to an embodiment.

FIG. 2 shows a functional block diagram of an architecture system 100 that may be used for graphics processing in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a GPU module 129, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voice-mail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the GPU module 129 comprises processes and/or programs for processing images and portions of images for rendering on the display 121 (e.g., 2D or 3D images). In one or more embodiments, the GPU module may comprise GPU hardware and memory (e.g., the processing element 400 architecture (FIG. 4), processing structure 1000 (FIG. 10), pipeline 1600 (FIG. 16), static random access memory (SRAM), dynamic RAM (DRAM), processing elements, cache, etc.).

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
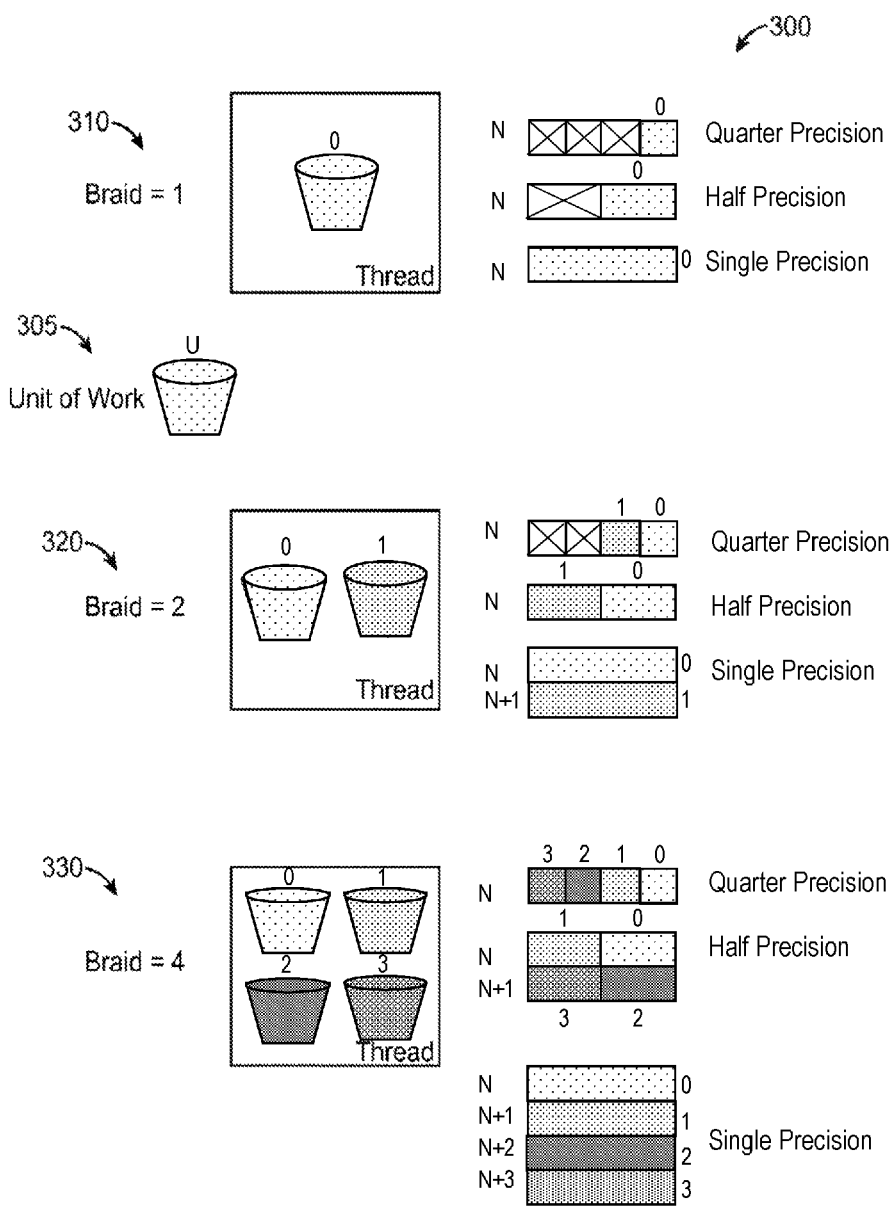
FIG. 3 illustrates packing one or more units of work into a single hardware thread.

FIG. 3 shows a diagram 300 of exemplary WARP control structures which may manage a plurality of threads, where each thread may include one or more units of work. Without loss of generality, shader threads process an input data set known as a unit of work, and produce an output data set. Without loss of generality, a unit of work is a set of input data that will pass through a shader program to produce an output set of data.

In one embodiment, the compiler bundles 1, 2, or 4 units of work into a single hardware thread in order to efficiently process data of different sizes. This bundle is known as a braid. The number of units of work in a braid determine how less than full width computation are performed, as shown in the diagram 300. Without loss of generality, braid=1 310 shows a thread with one unit of work 305 0, braid=2 320 shows a thread with two units of work 305 0 and 1, and braid=4 330 shows a thread with four units of work 305 0, 1, 2 and 3.

In one embodiment, a number of work units 305 are bound into a single hardware thread and then a number of those threads are bound together to execute a shader program into a structure referred to as a WARP. A WARP binds a multiplicity of work units 305 into a single point of control. Without loss of generality, the WARP may contain up to 32 hardware threads, and a compiler of a GPU (e.g., part of the GPU module 129, FIG. 2) may pack up to 4 units of work 305 (e.g., braid −4 330) into a single hardware thread. Without loss of generality, a processing element 400 (FIG. 4) may manage up to 8 WARPs.

Without loss of generality, each WARP is associated with 64-registers in the scalar register file. Without loss of generality, each scalar register is 32-bits in size. In one example embodiment, a 3-bit WARP Identifier number is concatenated with the scalar register specifier in an instruction in order to fully address a scalar register file. In one example embodiment, all threads in the WARP share the same scalar register file.

In one embodiment, a hardware thread is a point of control within a WARP. Each hardware thread is associated with a thread Register File. Without loss of generality, a thread may be allocated as few as 8 and as many as 256 registers with 8 register granularity. Without loss of generality, the WARP carries a register file base address which relocates instruction register specifiers into Register File address space. Without loss of generality, the register file 420 (FIG. 4) contains 32 KBytes of storage, which may be allocated to various WARPs. Without loss of generality, when the shader program uses 32 or fewer registers per thread, all 8 WARPs may be active simultaneously. In many embodiments, WARPs from different shaders may have different sized Register Files. Without loss of generality, the size of a given register file 420 is found in the shader header 610 (FIG. 5).

In one example embodiment, the braiding factor determines the placement of prefilled input data into the register file associated with threads of a WARP.

In one example embodiment, a 2-bit WARP braiding field identifies the mode of operation of the threads within the WARP. Without loss of generality, the braiding enables the compiler of the GPU to produce more optimal codes when shader programs utilize half precision and quarter precision instructions. In one example embodiment, the instructions compute 2 (half precision) or 4 (quarter precision) units of work 305 in a single instruction per thread when braided.

In one embodiment, each unit of work belongs to a different set of data or calculations. In one example embodiment, each unit of work 305 is associated with a lane of execution, and each lane of execution is governed by a bit from an execution mask. By associating a multiplicity of units of work with a single hardware thread, the architecture guarantees that all lanes of calculation may be fully utilized, according to one embodiment. In one example embodiment, a quarter precision integer instruction may process four 8-bit integer ADD instructions simultaneously, and each 8-bit ADD calculation belongs to a different unit of work 330 {3, 2, 1, and 0}. This is unlike MMX/SSE where several fields from one unit of work are processed simultaneously. In an MMX/SSE implementation, when one field needs to be ADDed and another SUBTRACTed, MMX requires data swizzling instructions (or ADDSUB instructions), which is distinguishable from one or more embodiments which does not. With one or more embodiments, all of the first fields from the plurality of units of work are ADDed and then all of the second fields from the plurality of units of work are SUBTRACTed. In one or more embodiments, no data swizzling instruction is required nor are any multi-function instructions required (such as ADDSUB).

Without loss of generality, in one embodiment the units of work 305 are governed by an execution mask, one bit in the mask governs a unique unit of work over the lifetime of a WARP. Without loss of generality, in one embodiment each instruction in a shader program identifies the associated unit of work 305 by specifying its calculation size and braid so that it may be properly governed. In one embodiment, the execution mask is manipulated to effect control transfer. Without loss of generality, in one embodiment a simple code sequence performs most of the control flow with compare instructions and with label instructions, but without executing control flow transfer instructions.

In one example embodiment, a trace 650 (FIG. 6) is a shader program fragment and consists of a trace header 670 and a number of instructions 660-661. Without loss of generality, in one embodiment the trace header 670 specifies a set of resources that must be available prior to running the instructions 660-661 with the trace 650 and a set of outstanding request that must have been performed prior to scheduling this WARP back into execution. The WARP scheduler uses this information in deciding which WARP to schedule.

Without loss of generality, in one embodiment a trace 650 (FIG. 6) has a limited maximum size (in the range of 64 to 256 instructions), and the compiler of the GPU will artificially break a trace when the instruction sequence would be too long, or when any instruction needs an outstanding request as an operand (such as a Load result or a texture result.)

In many embodiments, a WARP is in one of 4 states, Idle, Initializing, Executing, or Waiting.

Figure 4:
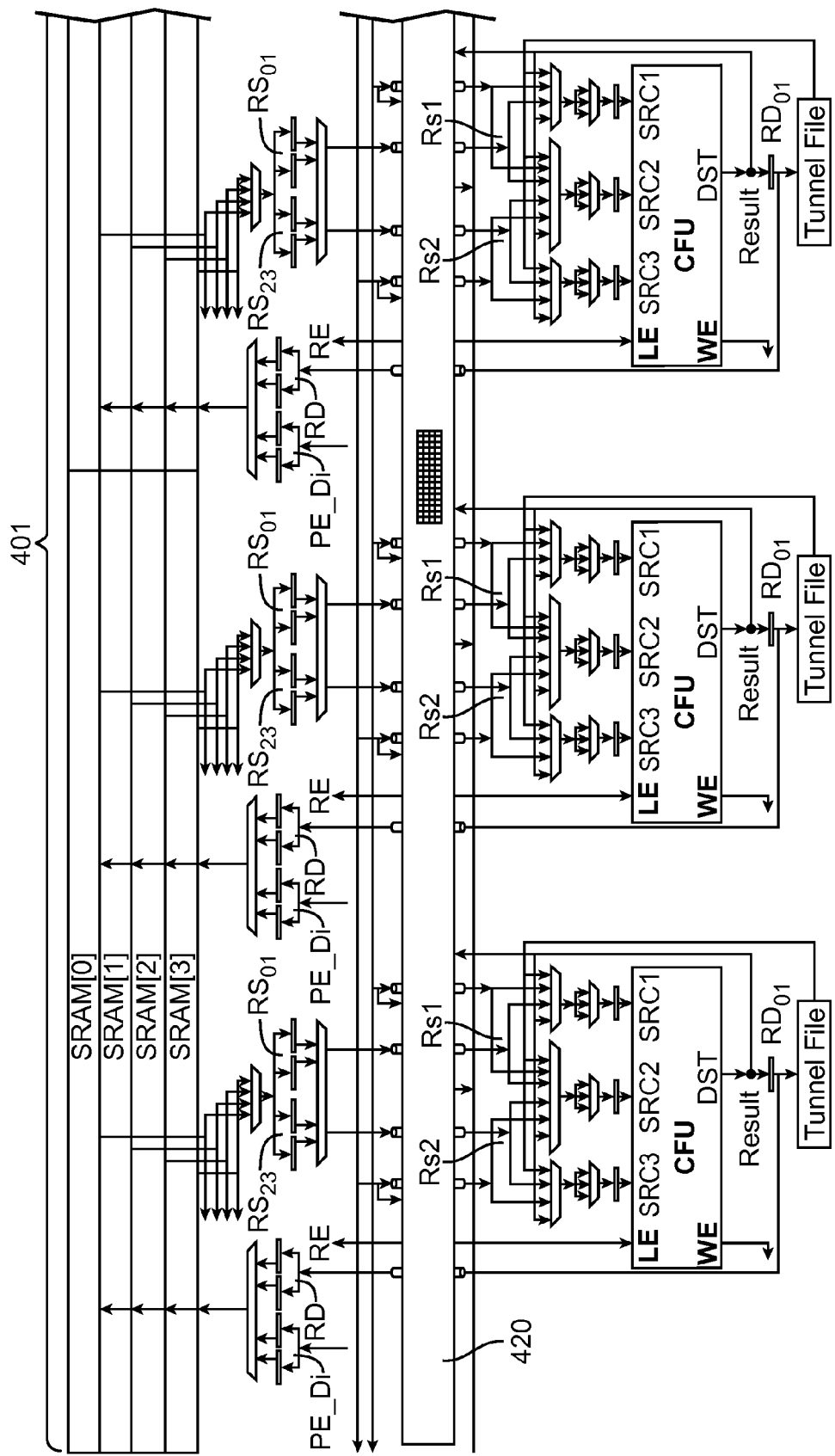
FIG. 4 shows an example processing element architecture, according to an embodiment.
Figure 5:
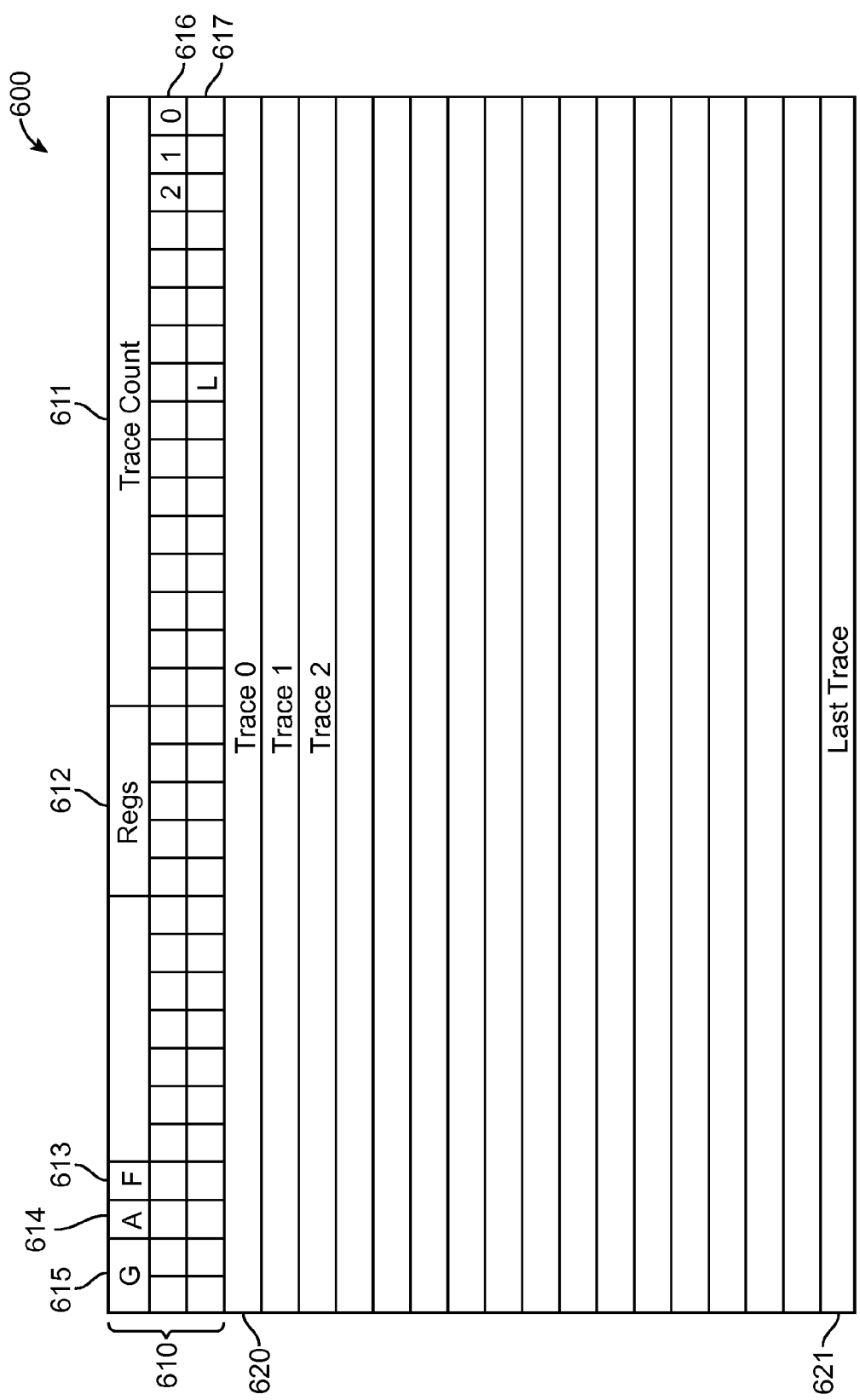
FIG. 5 shows an example shader format structure, according to an embodiment.

In one exemplary embodiment, an Idle WARP may be assigned units of work 305, assigned to a shader program, and allocated a Register File 420 (FIG. 4). A shader constructor initializes a WARP by moving units of work 305 to the register file 420, after which the WARP may be scheduled into execution. After Initialization WARPs toggle between the Waiting and Executing states until the end of the shader program at which time they return to the Idle state.

Once a WARP is configured and initialized, the WARP may be scheduled into execution when the resources required are available. Without loss of generality, once scheduled the WARP will execute all of the instructions in a trace 650. After completion of all instructions within a trace, the WARP enters the waiting state while the scheduled WARP immediately begins execution of its trace. Since the execution of a trace takes a large multiplicity of cycles, the WARP scheduler has time to find a subsequent WARP that may be scheduled.

Figure 6:
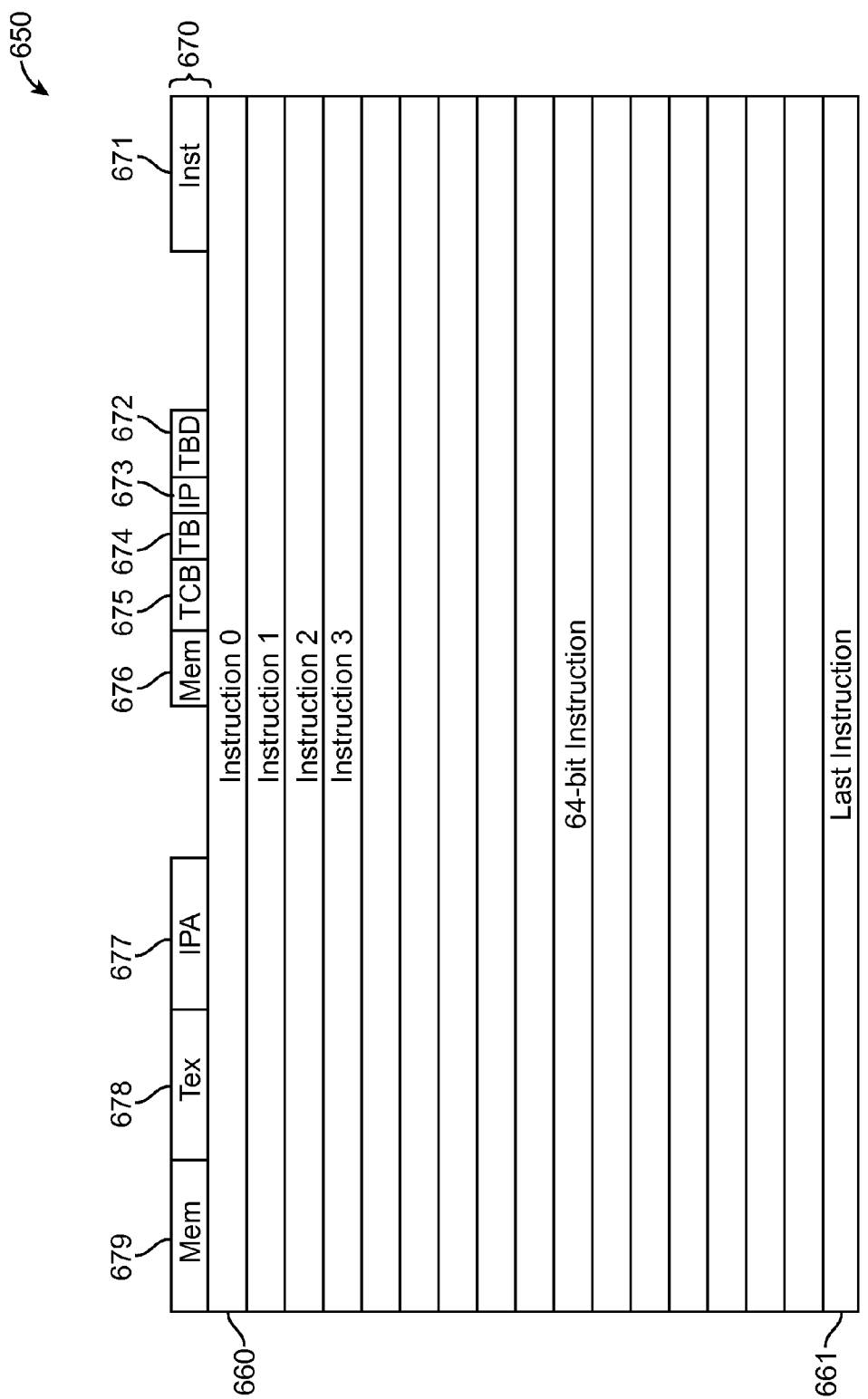
FIG. 6 shows an example trace format structure, according to an embodiment.

Without loss of generality, in one embodiment a WARP waits at a trace header 670 (FIG. 6). Without loss of generality, in one embodiment the trace header 670 contains the list of events that must take place before scheduling the WARP (back) into execution and a list of resources required to run the trace to completion. Once the resources are available and the events have occurred, the WARP becomes a candidate. In one exemplary embodiment, the WARP scheduler picks from among the contending WARP candidates for the next WARP to schedule.

In one exemplary embodiment, after the WARP is scheduled, the WARP scheduler preloads the Instruction Store 410 (FIG. 4) by requesting the instructions 660-661 (FIG. 6) in a trace 650 from the instruction cache to be deposited into the instruction store 410. In one example embodiment, once the trace 650 is installed in the Instruction Store 410, WARPs may be scheduled.

Without loss of generality, in one embodiment the WARP scheduler keeps track of which traces 650 are loaded into the Instruction Store 410 and skips the installation if the trace 650 is already present. Without loss of generality, in one embodiment the WARP scheduler prioritizes WARPs pending on the same trace 650 over WARPs pending on a trace 650 yet to be loaded.

In one example embodiment, the WARP may begin interpolation and texture accesses prior to the start of the shader program. In one embodiment, the register file allocation may be deferred until computations are ready to deliver values to the register file 400 (FIG. 4). The register file 400 is then allocated and said values are delivered in order to prefill the register file with input data. In one example embodiment, any required scalar data may also be written into the scalar register file.

FIG. 4 shows an exemplary processing element 400 architecture that may be used for implementing one or more embodiments. Without loss of generality, in one embodiment the processing element 400 comprises of 8 lanes 401-402 of computation, a register file 420, and an Instruction Store 410. Without loss of generality, in one embodiment the Instruction Store 410 contains the instruction decoder and the instruction sequencer. Without loss of generality, a register comprises a software value that may be delivered into computation and received from computation, and the register file 420 is an organization of SRAM instances that stores those registers.

Without loss of generality, a set of flip-flops known as a collector is used to sequence values out of and in to the SRAM based register file. The SRAM instance is read and written twice as wide as the desired operand or result. Over a 2 cycle period, one pair of operands is read then a successive pair of operands is read. Then over a second 2 cycle period, first one value of a pair and then the other value of the pair is delivered to an operand bus or received from the result bus by the collectors. By this means, the register file appears to have 2 ports while the SRAM has but 1 port.

In one embodiment, for the processing element 400 four operand flip-flops satisfy the needs of the collectors. Without loss of generality, the registers are used in even-odd pairs for the first two accesses and in even-even and odd-odd pairs on the second set of accesses, which complicates the control but saves the number of required flip-flops. Without loss of generality, both normal sequencing {Single Precision, Half Precision and Quarter Precision} utilize the collectors as described. Special functional units (SFU) sequencing {Double Precision and certain Integer instructions} follow a slightly different sequence.

Without loss of generality, the FMAD units perform single precision floating point arithmetic instructions. Without loss of generality, the Integer unit performs most integer arithmetic, logic operations, and memory address calculations. Without loss of generality, the BIT manipulation unit performs shifting and bit manipulation operations.

In FIG. 4, pipeline time flows strictly downward except for the two forwarding paths back to the computation unit input multiplexers. In FIG. 4, the structures at the top of the processing element 400 are the same PDP SRAM components as the structures at the bottom of the processing element 400. In FIG. 4, the upper PDP SRAM components are used to read operands and deliver them into computation, while the lower PDP SRAM components are used to write computed values back into the register file 420. The upper and lower SRAMs are the same structure.

FIG. 5 shows an example shader 600 format structure, according to an embodiment. Without loss of generality, in one embodiment a shader 600 is composed of a shader header 610, a shader Active Search Table 616, an array of trace pointers 617 (one for each trace 620-621) in the shader 600), and a number of traces 620-621. Without loss of generality, in one embodiment a shader 600 begins on a cache line boundary (32 or 64 bytes), and each element in the shader 600 is one word in length (4 bytes).

An instruction is said to Activate threads if it can manipulate the execution mask and turn bits that are off back into the on state. In one embodiment, the Active Search Table contains a set bit for each trace that contains such an instruction. Such instructions are referred to as Activating instructions.

Without loss of generality, in one example embodiment the A bit 614 specifies if the Active Search Table is list present. The Active Search Table is a bit vector with one bit for each Trace 620-621. In one example embodiment, the Active Search Table list is used to rapidly search forward for the first activating instruction when the execution mask has become zero. In one embodiment, the search is performed with a Find First Set circuit that may process up to 64 traces 620-621 per cycle in the search. Without loss of generality, in one embodiment once the trace number is found the trace pointer list is indexed, the trace header accessed, and the WARP may be scheduled to run that trace at its next opportunity.

Without loss of generality, in one embodiment the shader header 610 contains a trace count 611 of the number of traces 620-621 in the shader program, the register count 612 of the number of registers per thread, group control information 615, and a Fixed Function bit 613. Without loss of generality, in one embodiment immediately following the shader header 610 is the Active Search Table 616 that includes the same number of bits as there are traces in the shader program.

Without loss of generality, in one embodiment the Braid specifier of the braid control information 615 is used by the fixed function units in depositing a number of work units 305 (FIG. 3) into a single thread.

In one embodiment, when the Fixed Function Specifier bit 613 (F) is set, the first trace 620-621 in a shader 600 (i.e., trace number 0 or Trace 0) contains instructions for fixed function units. These instructions run autonomously and potentially concurrently with WARP execution. If the F bit 613 is not set, then trace 0 is the first trace 620-621 to be executed by the shader program.

In one embodiment, there are a number of Trace Pointers in the trace pointer array 617. In one embodiment, the trace pointer is used to access instructions over a 36-bit address space. Without loss of generality, in one embodiment the value of the pointer is shifted up by 6 bits (6 bits corresponds to 64-Byte cache lines and enables a 38-bit instruction address space) to become the virtual byte address of the first instruction.

Without loss of generality, in one embodiment another field in the shader header 610 includes data used to configure the Graphics Pipeline (e.g., graphics pipeline 1100, FIG. 11) to fill the registers correctly based on both braid and size of input data item. Without loss of generality, in one embodiment an additional field in the shader header 610 includes data to configure the receiving Graphics Pipeline 1100 for the data to be emitted near the end of the shader program. The additional fields may also be stored in a Graphics Pipeline Configuration data structure, which contain pointers to the shaders pertinent to this pipeline configuration.

In one example embodiment, when a Graphics Pipeline 1600 (FIG. 16) is configured, the driver initializes a constant scratch register file from uniforms which will run in this Graphics Pipeline configuration. This preloading of constant scratch is then useable over all WARPs that run this particular shader, saving memory bandwidth and power consumption. Without loss of generality, constant scratch is shared across 4 processing elements 400 (FIG. 4) in a Shader core of a GPU. This pre-configuration eliminates the load instruction and its associated latency from the shader program. Without loss of generality, in one embodiment the input data set is placed into the register file 420 (FIG. 4) by shader constructors prior to the WARP starting to execute the shader 600.

FIG. 6 shows an example trace 650 format structure, according to an embodiment. Without loss of generality, in one embodiment a trace 650 is a series of instructions 660-661 that will be performed entirely from one scheduling event of one WARP. Without loss of generality, in one embodiment a trace 650 comprises a trace header 670, and a series of processing element 400 (FIG. 4) instructions 660-661. In one embodiment, no instruction in a trace 650 may be dependent upon a result with unknowable latency from the same trace.

In one embodiment, the trace header 670 and all instructions 660-661 are 64-bits in size and begin on a cache line boundary. Without loss of generality, in one embodiment the trace header 670 contains fields used to represent the outstanding events that must occur prior to this WARP being <re>scheduled. Without loss of generality, in one embodiment the trace header 670 includes fields for up to 8-outstanding memory references 679, up to 8-outstanding texture references 678, and up to 8 outstanding Interpolation references (IPA) 677 simultaneously. In one example embodiment, another field exists to indicate dependence upon Texture coordinate Buffer Done (TBD) 672. Without loss of generality, in one embodiment the trace header 670 also contains field descriptors of the amount of buffer space required prior to this WARP being scheduled. In one embodiment, the Mem field 676 describes how many memory references must be available in the Memory Address Buffer prior to scheduling the WARP. In one embodiment, the TCB field 675 describes how many Texture Coordinates must be allocated in the Texture Coordinate Buffer prior to schedule. In one embodiment, The TB field 674 describes the persistence of the TCB allocation, and the IP field 673 specifies the number of IPA requests (IPA is mainly Push Mode, the alternative is to send (Pull) Page Table Entries to the processing element 400 (FIG. 4) and have it compute its own interpolations).

In one example embodiment, the number of instructions 671 in a trace 650 is limited to a fraction (¼) of the size of the shared instruction store 410 (FIG. 4), for example between 64 and 256 instructions.

Figure 16:
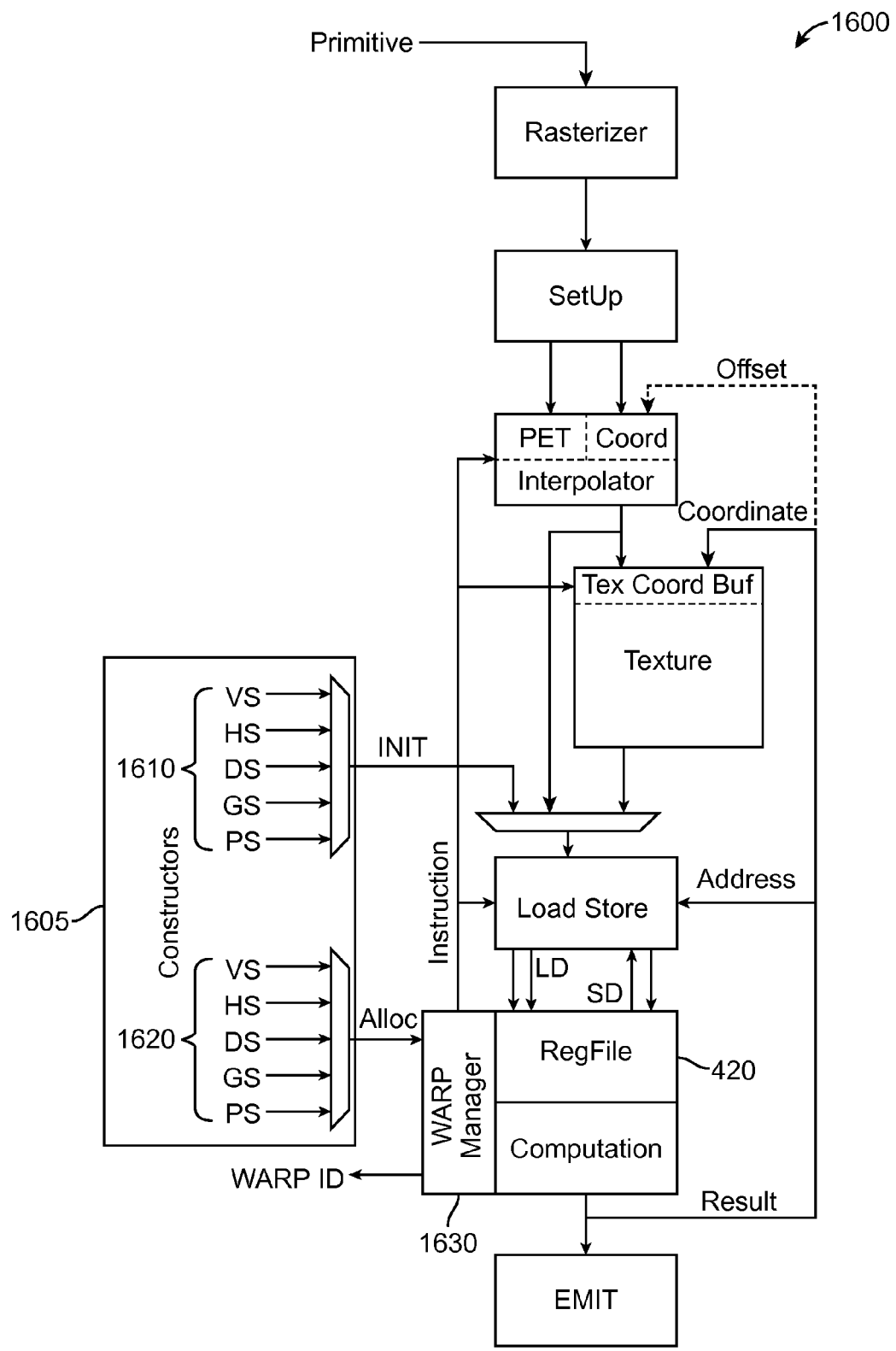
FIG. 16 shows an example graphics pipeline, according to an embodiment.

Without loss of generality, in one embodiment each instruction 660-661 processes up to 32 computations, 8 computations at a time over 4 beats of the pipeline 1600 (FIG. 16). Once scheduled a trace 650 may take several hundred cycles to complete. This gives the WARP scheduler time to choose candidates, then schedule the successor WARP, and also to pre-load the instruction store so that the WARP switch may take place between instructions 660-661 with little or no temporal overhead.

In one embodiment, as a trace 650 executes, a number or outstanding events are recorded. In one embodiment, the trace header 670 of the subsequent trace contains a set of fields denoting outstanding events that must have become resolved prior to scheduling the WARP on the subsequent trace. In one embodiment, this means WARPs are not scheduled into execution until all required outstanding results have been performed. In one embodiment, this also means that the shader compiler may decide that some of the outstanding events are not needed in order to execute the subsequent trace.

In one embodiment, as instructions 660-661 are deposited into the instruction store 410 (FIG. 4), the instruction is examined, and if the instruction can activate threads, then the instruction decoded sets a bit in the Activate search table associated with the instruction store 616 (FIG. 5).

In one embodiment, if the execution mask ever becomes empty, this Activate search table 616 is used to rapidly skip instructions that have no chance of turning idle units of work back into an active state. In one example embodiment, along with the Activate Search Table 616 used by the WARP scheduler, once the execution mask becomes empty, then the only instructions that get executed are the ones that may turn inactive units of work 305 (FIG. 3) back into active units of work 305.

Figure 7:
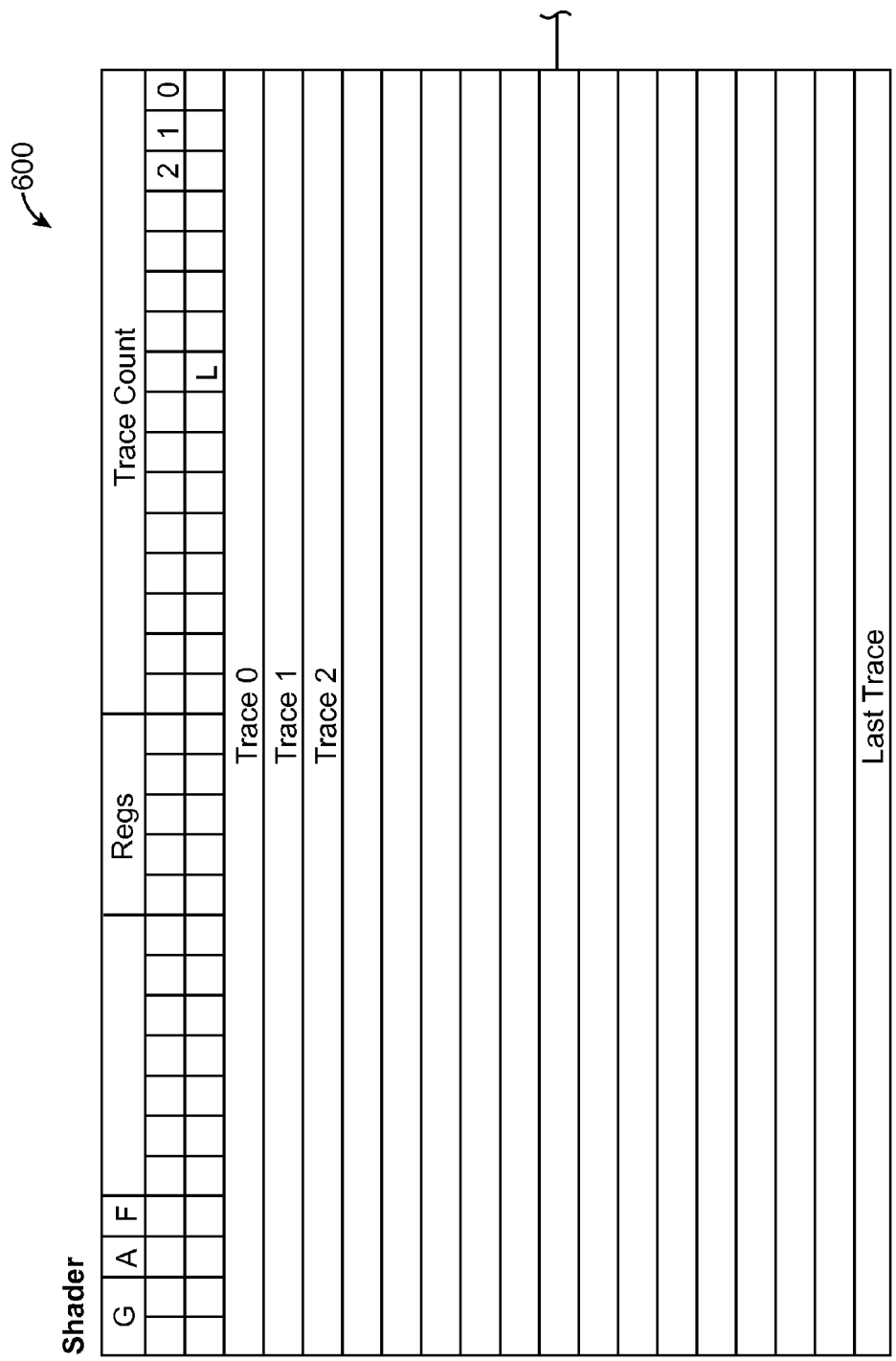
FIG. 7 shows an example trace format structure including activating instructions vector, according to an embodiment.
Figure 7:
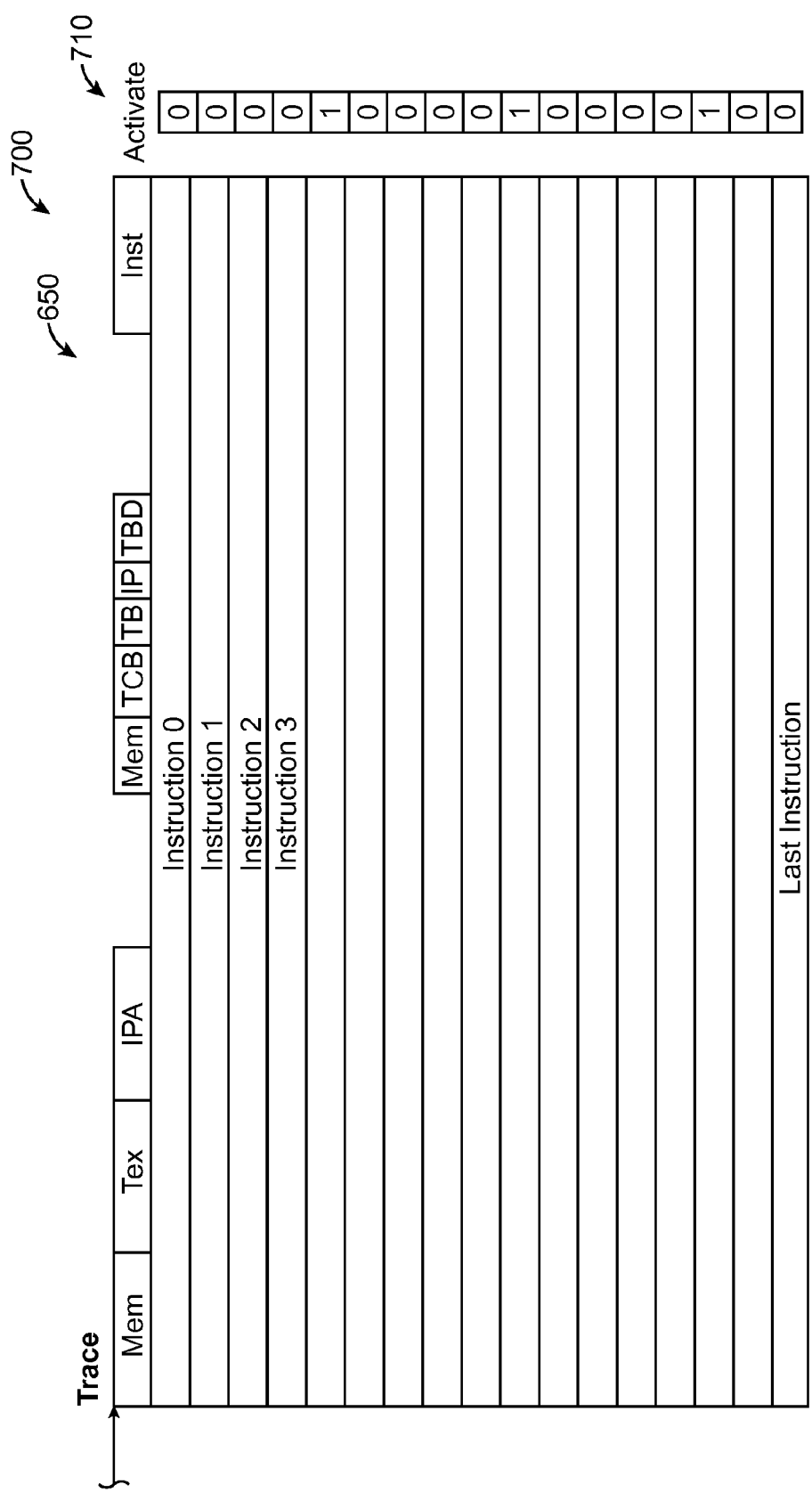

FIG. 7 shows an example 700 of a shader 600 and trace 650 relationship, according to an embodiment. In one embodiment, both shader 600 and trace 650 are located on cache line boundaries. In one embodiment, the addressable instruction space is increased by the same amount 64 Byte cache lines enable 32-bit pointers to point into 38-bit byte-addressable space.

In one or more embodiments, the example 700 shows the trace 650 with an activate bit-vector or activating search table 710 of activating instructions generated by an instruction decoder. In one embodiment, as instructions are placed into the instruction store 410 (FIG. 4), if the instruction activates threads, then the instruction decoder sets a bit in the activating search table 710 (e.g., shown as 1 "1"). In one embodiment, if the execution mask (e.g., 1010, FIG. 10) ever becomes empty, the activating search table 710 is used to rapidly skip instructions (e.g., shown with a "0") that will perform no work.

In one embodiment, the activate search table of the instruction store along with the activating search table 710 used by the WARP scheduler, are used across trace boundaries to rapidly skip all instructions that will perform no useful work, without missing any chances to execute instructions that may reactivate various threads. In one embodiment, the rapidity of the search minimizes the number of control flow transfer instructions that are required. In one embodiment, almost all instruction sequences less than 10 instructions are more efficiently skipped than branched over.

Figure 8:
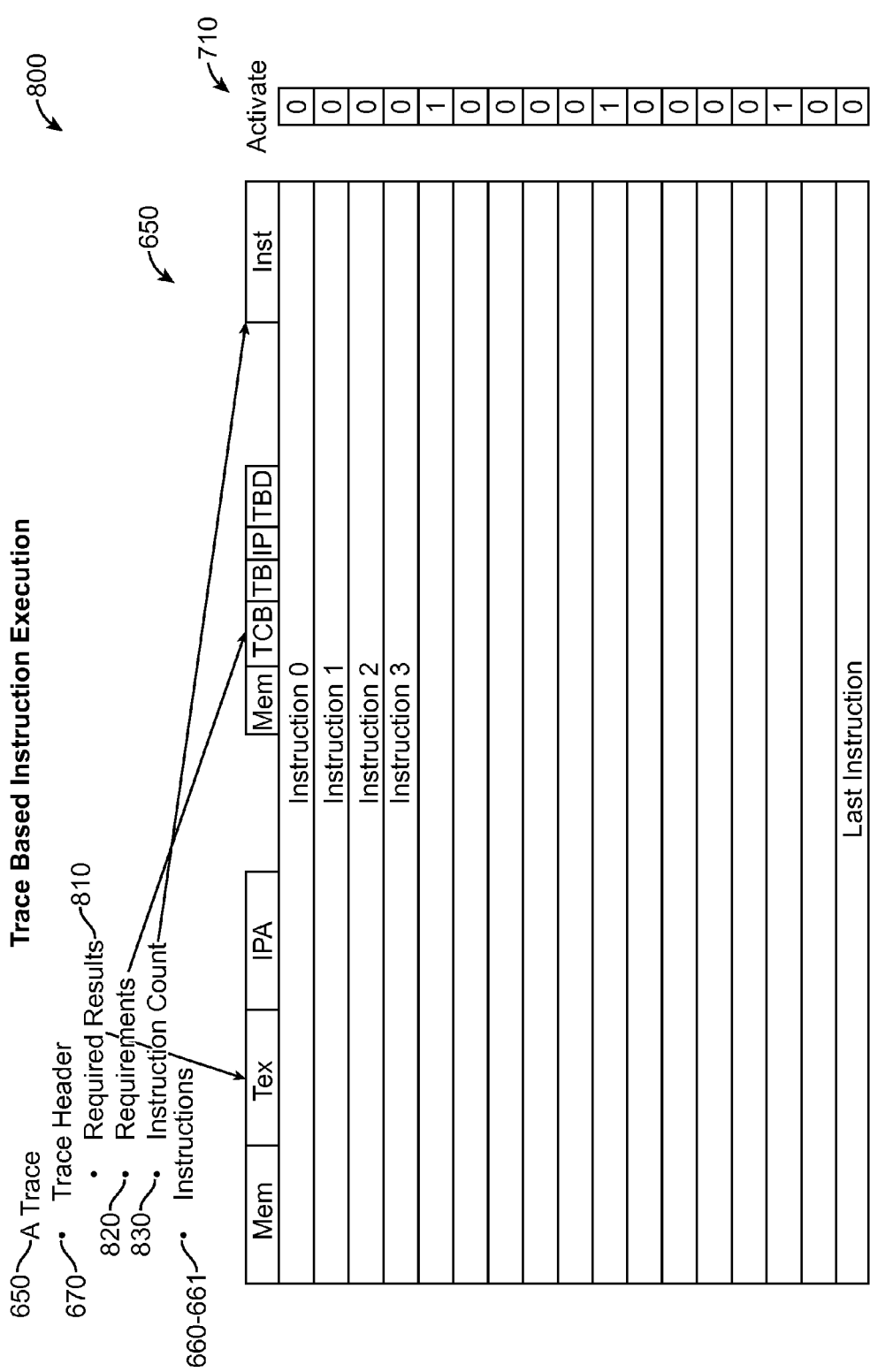
FIG. 8 shows an example trace structure format and header with multiple requirements, according to an embodiment.

FIG. 8 shows an example 800 trace 650 structure format and header 670 with multiple requirements, according to an embodiment. In one embodiment, the trace header 670 includes required results 810 (e.g., dependent hardware events that must complete), resource requirements 820 and instruction count 830, The example 800 also shows the activating search table 710 including an activating instruction indication that is used to activate/deactivate the instructions 660-661. In one embodiment, the trace 650 includes bit vectors of which previous resource requests must be satisfied, and the instruction counts of new requests that will be issued. Without loss of generality, in one embodiment only activating instructions are executed when the execution mask is empty.

Figure 9:
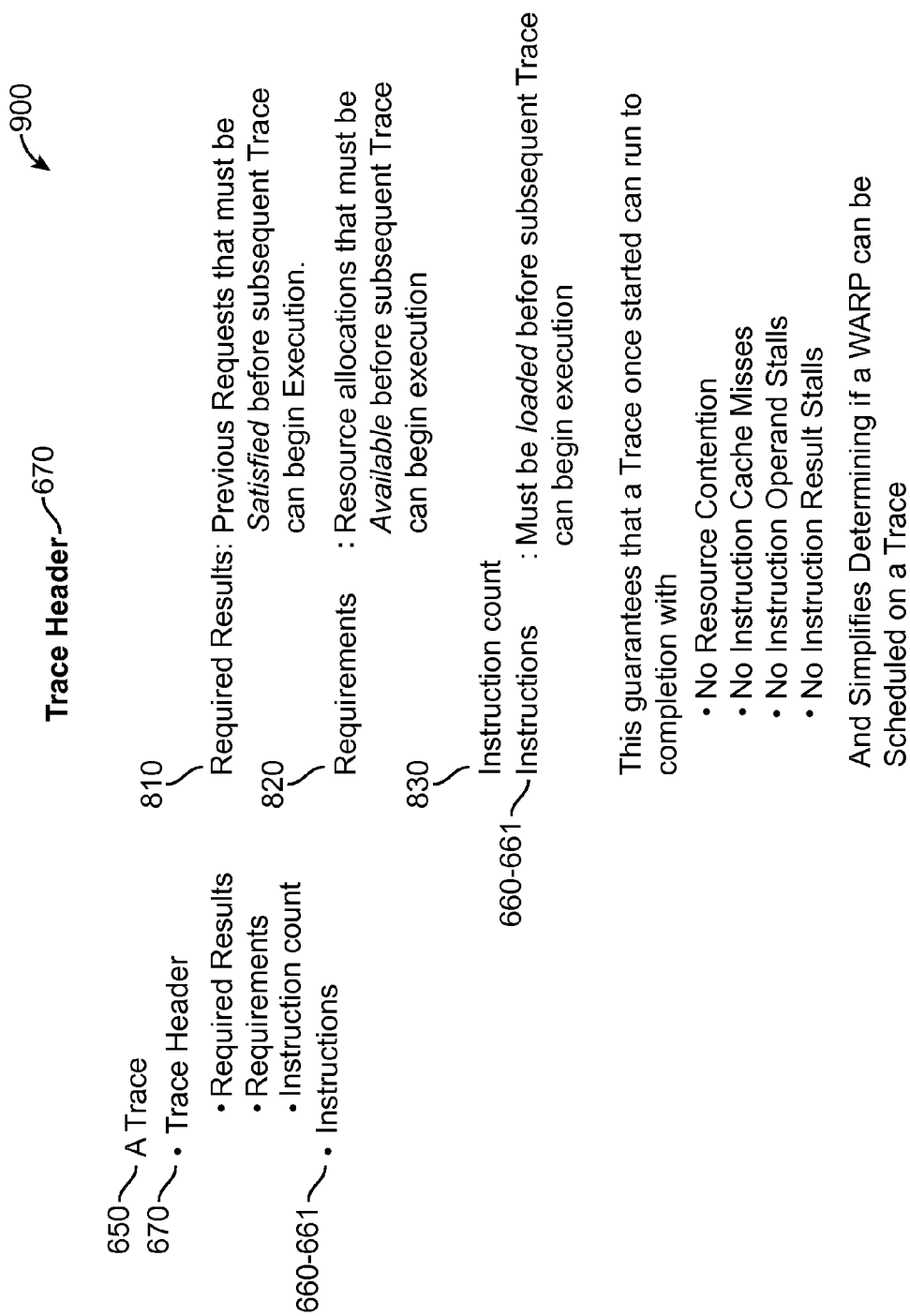
FIG. 9 shows an example trace header organization, according to an embodiment.

FIG. 9 shows an example trace header 670 organization 900, according to an embodiment. In one embodiment, the organization 900 shows the structure of the trace 650 including the trace header 650 and instructions 660-661. Without loss of generality, in one embodiment the required results 810 are shown to include previous requests that must be satisfied before a subsequent trace may begin execution. Without loss of generality, in one embodiment the requirements 820 include resource allocations that must be available before a subsequent trace may begin execution. Without loss of generality, in one embodiment the instruction count is the number of instructions 660-661 that must be loaded before a subsequent trace may begin execution. Without loss of generality, in one embodiment the organization 900 of the trace 650 guarantees that a trace 650, once started, may run to completion with: no resource contention, no instruction cache misses, no instruction operand stalls, and no instruction result stalls (and simplifies determining if a WARP may be scheduled on a trace 650).

Figure 10:
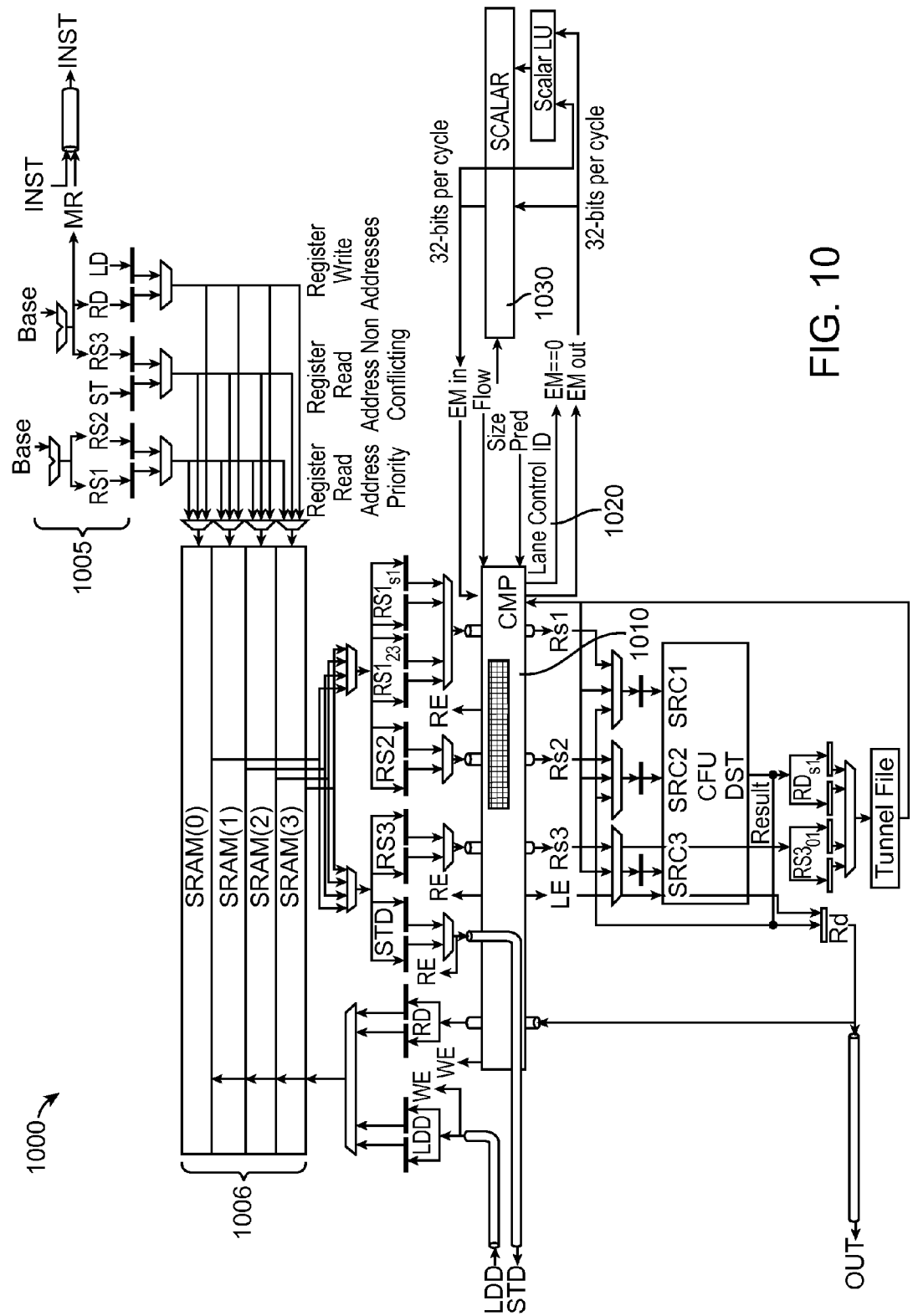
FIG. 10 shows an example processing structure with lane control, according to an embodiment.

FIG. 10 shows an example processing structure 1000 (e.g., processing element, shader core, etc.) with lane control 1020, according to an embodiment. In one embodiment, execution within the processing structure 1000 is controlled by an execution mask 1010. Without loss of generality, in one embodiment the execution mask 1000 generates read enable control bits for the SRAM-based Register File, computation lane enable control bits, and write enable control bits also for the SRAM-based Register File. Without loss of generality, in one embodiment reference 1005 indicates the register output port to the load store unit 1006. In one example embodiment, the register is written (Load Instruction) or read (Store Instruction) under control of the load store unit 1006. Without loss of generality, in one embodiment the Store port alleviates the load store unit 1006 from having to have a buffer of store data waiting for cache lines to arrive and absorb the data to be written. Without loss of generality, in one embodiment the store data read access is performed when it is non-conflicting with the RS2 register access.

In one embodiment, the execution mask 1020 generates the Read Enable, Write Enable, and Lane Enable control bits based on the instruction being executed. In one embodiment, the lane control 1020 includes an interface to the scalar register file 1030.

In one embodiment, Lane Enable bits are concatenated with the addresses as they are shipped to the load store unit 1006. In one embodiment, the load store unit 1006 sends the Lane Enable bits back when the Load or Store accesses the register file. In one embodiment, the scalar register file 1030 has a logic unit associated with it to perform bit manipulation necessary as any compare, label, and JOIN instructions manipulate the execution mask 1010. In one embodiment, these logical operations may run concurrently with process instructions in the computation lanes. In one embodiment, instructions more complicated than logical scalar instructions are processed in the Lane 3 computation unit (e.g., 401/402, FIG. 4). In one embodiment, the logic unit of the scalar register file 1030 may only perform AND, OR, and XOR computations with bit inversion of the operands.

Without loss of generality, in one embodiment at WARP switch time, the 128 execution mask control bits are written into the Scalar Register File, and the 128 control bits of the newly scheduled WARP are read out and placed in the Execution Mask 1020. In one embodiment, a shared operand bus connects the instruction pipeline 410 (FIG. 4) with the computational Lanes 401/402. In one embodiment, the shared operand bus delivers scalar register operands, instruction immediates, constant scratch accesses, and instruction displacements directly to all computational units. In one embodiment, a unique bus is located from the closest computational lane to the loop buffer 410 that may deliver a computed result targeting a scalar register.

Without loss of generality, in one embodiment because a multiplicity of threads are contained under a single point of control, control flow in an SIMT environment may be significantly different than flow control in a SISD (i.e., vonNeumann) architecture. The typical vonNeumann control flow architecture executes a condition setting instruction and then a <conditional> control flow transfer instruction, and then the next instruction fetched is from the target of that control flow transfer instruction if taken. SIMT control flow cannot transfer control in this manner because not every thread may take the control flow transfer, and only when all threads take the control flow transfer can control be diverted from where it is to the new targeted instruction.

Without loss of generality, in one embodiment the register file of a WARP is controlled by the base offset contained within the WARP data structure. In one example embodiment, a register in an instruction is mapped into the Register File by adding the base shifted up by 2 bits in the WARP to the register in the instruction. In one embodiment, an add instruction is performed by a 5-bit adder.

Without loss of generality, in one embodiment a register address presented to centralized fixed function units contains a Processing Element Number, a Register File bit, and a register address. Without loss of generality, in one embodiment the low order 2 bits of the register address select the SRAM bank of the Load Store Unit 1006. Without loss of generality, in one embodiment the Processing element number routes the request to the register file of the appropriate Processing Element while the Register File bit selects between a <thread> register File access or a Scalar Register File access.

Without loss of generality, in one embodiment the scalar register file 1030 of a WARP is directly associated with the WARP by a WARP ID. Without loss of generality, in one embodiment each scalar register file 1030 contains 64-entries of 32-bits each. In one example embodiment, since there are 8 WARPs, there are a total of 512 total registers in the scalar register file 1030. In one embodiment, the scalar register file 1030 is contained in a 128-by 128 PDP SRAM instance.

In one embodiment, Read Enable and Write Enable bits are used to specify which 32-bit entry on a given word line is appropriate for the access at hand. In one embodiment, a Read of a scalar register may be spread or "smeared" over the OUT bus so that a scalar value gets written to a number of unique locations—effectively this is a vector scatter of a scalar value. In one embodiment, the "smear" is identified by Read Enables.

In one or more embodiments, a WARP executes instructions on behalf of all bound hardware threads in such a way that each instruction sees the results of the previous instruction immediately and may use such results as operands immediately via forwarding or with some delay by utilizing a tunnel register file.

In one embodiment, forwarding is a process by which the result of a computation is used immediately in the subsequent instruction as an input operand. In one embodiment, a computed result is available for forwarding exactly once, and forwarding is the only means to obtain this value. Without loss of generality, in one embodiment each computational lane (see, e.g., 401/402, FIG. 4) has between 4 and 16 tunnel registers of 32-bits each. In one embodiment, the compiler for the processing structure 1000 may place values in this tunnel file for subsequent reuse within a trace, but this file does not persist over trace boundaries. In one embodiment, the tunnel file is used to hold values over at least one instruction boundary.

Figure 11:
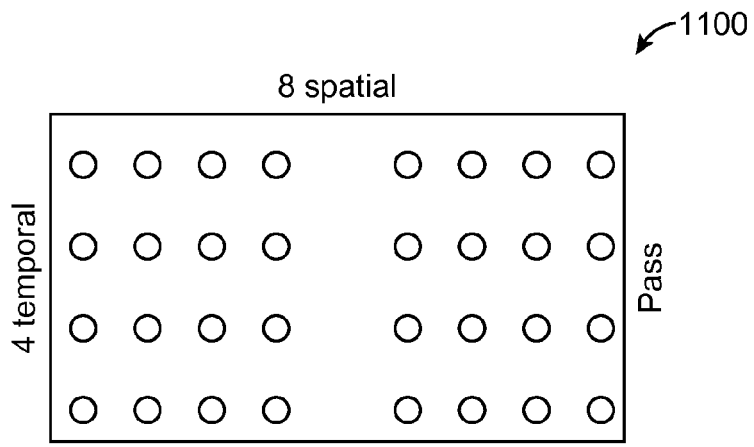
FIG. 11 shows an example representation for a WARP, according to an embodiment.

FIG. 11 shows an example representation 1100 for a WARP, according to an embodiment. Without loss of generality, in one embodiment the example representation 1100 shows threads of a WARP that are executed over four beats of the execution pipeline (e.g., for architecture structures 400, 1000). Without loss of generality, in one embodiment threads are numbered from right to left from top to bottom of the representation 1100. In one example embodiment, the 8 bits (represented by the dots) at the top of the representation 1100 represent thread 7 through thread 0. Without loss of generality, in one embodiment the space in the center of the representation 1100 is to remind engineers/programmers of the instruction pipeline 410 (FIG. 4) sitting in the middle of the computational lanes 401/402.

The representation 1100 is used for explaining flow of control, and illustrates a WARP where every unit of work is being processed. Without loss of generality, some WARPs may not be filled up to 32 threads, and some threads in a WARP may choose to die (by executing a DISCARD instruction) while the thread is executing in a shader. In one example, as a thread dies, its execution mask 1010 (FIG. 10) control bit(s) is (are) cleared, and the compiler places a value in a particular Scalar register so that instructions that activate idle threads will not reactivate the dead threads.

In one embodiment, SIMT flow of control manipulates an execution mask 1010 (FIG. 10) to effect small scale flow control. Without loss of generality, in one embodiment units of work are enabled and disabled via the execution mask to cause the appearance of control flow. In one embodiment, only backwards branches are taken. That is, the program counter is actually set to the location specified in the branch, and even here, the backwards branch is then only taken when there remain active threads.

In one embodiment, small scale forward branching is performed by compare instructions and execution mask 1010 manipulations. The classical flow control construct is the IF-THEN-ELSE construct, where a comparison is used to direct some threads through the "THEN" clause and some other threads through the "ELSE" clause. In one embodiment, in no case does one thread execute in both "THEN" and "ELSE" clauses.

Figure 12:
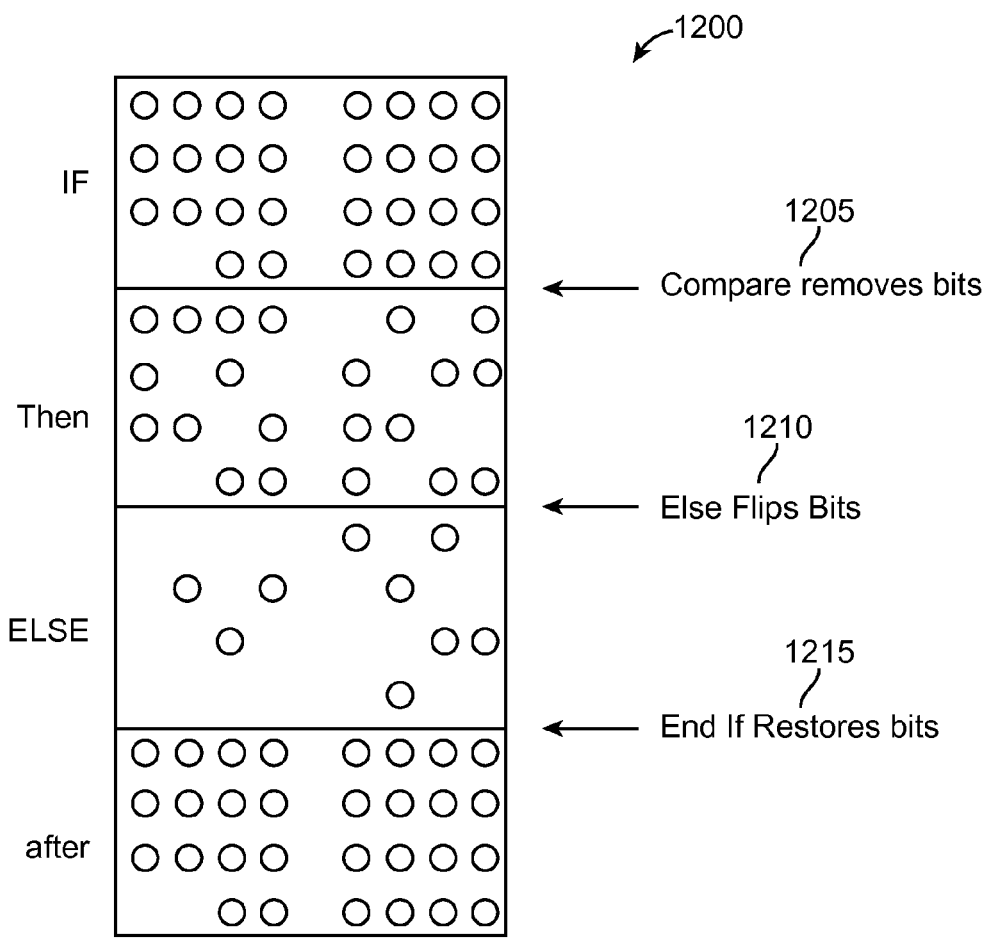
FIG. 12 shows an example representation for an if-then-else clause, according to an embodiment.

FIG. 12 shows an example representation 1200 for an IF-THEN-ELSE clause, according to an embodiment. In one example embodiment, consider a WARP with 30 active threads entering an IF-THEN-ELSE statement. In one example embodiment, the representation 1200 has 30 enabled bits, the lower left hand corner lacking active threads. In one embodiment, there will be a sequence of instructions typically leading up to a compare instruction. In one embodiment, the comparison will decide which threads enter the "THEN" clause and which threads are to enter the "ELSE" clause. In one embodiment, SIMT execution style executes instructions in both the "THEN" clause and the "ELSE" clause controlling which threads execute in one clause to the other by means of the execution mask 1010.

In one example embodiment, the representation 1200 shows the compare representation 1205 that removes bits from the thirty bits, the "ELSE" representation 1210 flips the bits from the "Then" clause to the bits appropriate for the "ELSE" clause and the "END-IF" representation 1215 restores bits. It should be noticed that the active threads in the "THEN" clause are the inverse of the active threads in the "ELSE" clause, except for the threads that were inactive entering the IF-THEN-ELSE clause. In one example embodiment, the only functional requirement of the execution mask 1010 (FIG. 10) is that lanes 401/402 (FIG. 4) that are not active, do not deliver (i.e., write) results, raise exceptions or faults. In one embodiment, the execution mask

1010 provides the ability to control register file read accesses, operand delivery, computation, result delivery, along with result writes, which in turn reduces resource consumption, such as processor usage, memory usage, power usage, etc.

In one embodiment, small scale forward branching is performed by efficiently skipping instructions between the current point and the points in the shader where inactive work units may be activated without using control flow transfer instructions. In one embodiment, each unit of work is associated with a bit in the execution mask 1010 which governs the execution of that unit of work. In one embodiment, computation units of work are controlled by a combination of an execution mask 1010, the instruction braid factor, and the size of the computation. In one embodiment, the typical IF-THEN-ELSE control flow expressed in shader programs is expressed in few instructions and the transition from a "THEN" clause to an "ELSE" clause and in exiting of the IF-THEN-ELSE construct takes as few instructions and as little time as possible.

Figure 13:
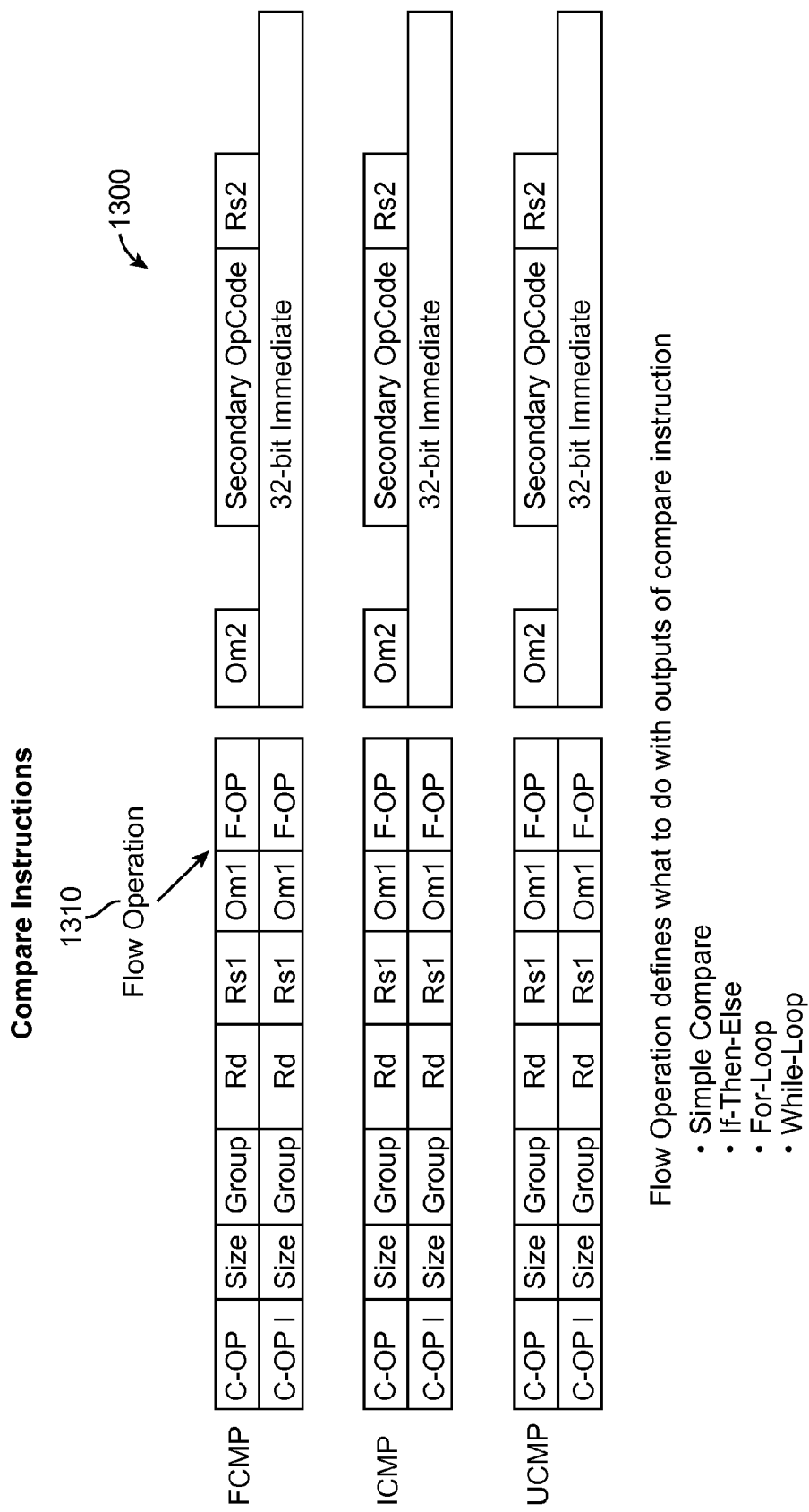
FIG. 13 shows an example representation for compare instructions, according to an embodiment.

FIG. 13 shows an example representation 1300 for compare instructions, according to an embodiment. There are three compare instructions shown in order in the example representation 1300 from top to bottom as: floating point, signed integer and unsigned integer. In one embodiment, the compare instructions include a flow operation field 1310. In one embodiment, compare instructions compare an operand with another operand, or immediate, and generate a TRUE or FALSE value. In one embodiment, the floating point value NaN will compare unequal to anything, including itself. That is if some register contains a NaN and one compares the register to itself the result of the compare will be FALSE.

In one embodiment, compare instructions with a thread register destination compute TRUE (field of 1-bits) and FALSE (field of 0-bits) values and deliver these as specified in the instruction. In one example embodiment, the field size for single precision and double precision are 32-bits, for half precision the field size is 16-bits, and for quarter precision the field size is 8-bits. In one embodiment, compare instructions with a scalar register result compute single bit TRUE (0B1) and FALSE (0B0). These bits are then packed into a 32-bit result. In one embodiment, single precision and double precision comparison instructions produce a 32-bit vector, while half precision compare instructions produce a 64-bit vector, and quarter precision compare instructions produce a 128-bit vector. In one or more embodiments, a compare instruction performing a unit of work that is inactive will deliver FALSE bit(s) to the scalar register.

In one embodiment, compare instructions can specify some logical operations between the execution mask 1010 (FIG. 10) and the produced compare result which results in updating the execution mask 1010 with one bit-pattern while storing another updated bit pattern in the targeted scalar register. These operations directly support high level shader language control flow semantics.

In one embodiment, compare instructions come with a tertiary OpCode 1310. In one embodiment, the tertiary OpCode 1310 is used to manipulate the execution mask 1010 (FIG. 10) directly. In one embodiment, there are tertiary OpCodes 1310 that assist the various shader language constructs such as IF-THEN-ELSE, loops, and SWITCH statements. In one embodiment, the bit-vector produced depends on the comparisons, while the bit vector stored in the scalar register 1030 depends on both the comparisons and the current execution mask.

In one embodiment, compare instructions with NoOp tertiary OpCode 1310 just stores the bit pattern of the compare instruction into the scalar register 1030 with no change to the execution mask:
Sn=CMP.

In one embodiment, compare instructions with a "THEN" tertiary OpCode 1310 remove lanes (e.g., 401/402, FIG. 4) from execution and store the removed lanes in the scalar register 1030. In one or more embodiments, the tertiary OpCodes 1310 "ANDAND" and, "ANDTHEN" performs the same function as "THEN" and are present for instruction readability:
Sn=EM^CMP
EM=CMP.

In one embodiment, compare instructions with the "LOOP" tertiary OpCode 1310 remove lanes from execution accumulating these in the scalar register 1030 (FIG. 10). In one embodiment, the tertiary OpCodes 1310 "BREAK," "CONT" and, "ORTHEN" performs the same function and are present for instruction readability:
Sn=Sn|EM^CMP
EM=CMP.

In one embodiment, compare instructions with a "FIRSTOR" tertiary OpCode 1310 remove lanes from execution and store the removed lanes in the scalar register 1030 (FIG. 10):
Sn=EM^~CMP
EM=~CMP.

In one embodiment, compare instructions with the "OROR" tertiary OpCode 1310 remove lanes from execution accumulating these in the scalar register 1030:
Sn=Sn|EM^~CMP
EM=EM & ~CMP In one embodiment, the JOIN instructions are a <thread> compare instructions that are executed only when the lane is inactive. In one embodiment, the purpose of these instructions is to perform a comparison and turn lanes back into the active state. In many ways it is the contra-positive of the compare instruction. The JOIN instruction performs a comparison on inactive threads and enables execution rather than performing a comparison on active threads and deactivating them. JOIN has the operations semantics of:
EM=EM|CMP In one embodiment, the JOIN instructions are classified as different instructions than compare because it operates under the inversion of the execution mask 1010 (FIG. 10). In one embodiment, the JOIN instructions are in the class of instructions that activate inactive work units whereas compare instructions are not. In one embodiment, there are both an Inclusive JOIN and an Exclusive JOIN instructions. In one embodiment, the Inclusive JOIN allows more threads to Activate, while the Exclusive JOIN inactivates Active units of work and potentially activates inactive units of work. The former may be used when flow passes through a case statement without a BREAK-STATEMENT, the latter with a BREAK-STATEMENT.

In one embodiment, the label instructions directly manipulate the execution mask 1030 (FIG. 10) bit-vector controlling which lanes process data on any given instruction execution. In one example embodiment, the label instructions are scalar instructions out from under the control of the execution mask 1010. In one embodiment, the ELSE instruction is used to transit between the "THEN" to the "ELSE" clause of an IF-THEN-ELSE programming language construct. In one embodiment, the scalar register 1030 contains the execution mask 1010 bit pattern for the "ELSE" clause, which is setup by the compare instruction. In one example embodiment, the scalar register 1030 will end up containing the execution mask 1010 bit pattern from before the compare instruction:

Sn=Sn^EM

EM=Sn^EM.

In one embodiment, the ENDIF label instruction is used to exit the IF-THEN-ELSE clause:

EM=EM|Sn.

In one embodiment, the ENDIF instructions only manipulate the execution mask 1010 with respect to a scalar register 1030, and are expected to run concurrently with normal thread instructions and, thus, take no visible execution time.

In one embodiment, the braid specifier, execution mask 1010, compare instructions and label instructions are architected to perform IF-THEN-ELSE sequences efficiently in a braided SIMT manner. The following illustrates a conventional IF-THEN-ELSE sequence expressed in a conventional SIMT instruction set and the instruction usages:

```
if( a > b )   FCMPGT   s8,Ra,Rb
{             XOR      s4,s8,EM
              MOV      EM,s8
~
}
else          MOV      EM,s4      // from then to else clause
{
~
}             OR       EM,EM,s8   // exit if-the-else
~
```

The above instruction sequence might be produced by the compiler, however, with the extension employed by one or more embodiments, and extension of the compare instruction, the sequence may be expressed with one fewer scalar register and two fewer instructions as follows:

```
~
if( a > b )   FCMPGT   s4,Ra,Rb,then
{
~
}
else          ELSE     s4   // from then to else clause
{
~
}             ENDIF    s4   // exit if-the-else
~
```

In one embodiment, at the end of the FCMPGT (floating point compare for greater than) instruction, S4 contains all of the lanes which should be turned on when the "ELSE" clause is reached, while the execution mask contains the lanes which will execute the "THEN" clause. The ELSE instruction and the ENDIF instruction are a members of the LABEL instruction group. At the end of the ELSE instruction, S4 contains all of the lanes which entered the "IF" statement. In one embodiment, at the end of the ENDIF instruction the execution mask has been restored to its original state.

In one example embodiment, IF-THEN-ELSE clauses may be nested, as illustrated:

```
~
if( a > b )   FCMPGT   s4,Ra,Rb,then
{
~
   if( c < d ) FCMPLT  s8,Rc,Rd,then
   {
   ~
   }          ENDIF    s8   // no else clause
~
}
else          ELSE     s4   // from then to else
clause
{
~
}             ENDIF    s4   // exit nested if-
the-else
~
```

In one example embodiment, it may be seen that an IF-THEN is nested inside an IF-THEN-ELSE. In one embodiment, the label instructions (ELSE and ENDIF) operate concurrently with the last instruction of the previous clause and thus appear to take zero execution time.

In one example embodiment, four compare instructions, each associated with a different unit of work, set up an execution mask 1010 (FIG. 10) governing all the threads of the WARP. The example embodiment illustrated below shows the mismatch in computation widths and compared organized into groups of units of work:

```
FCMPGT.S0    S4,Ra,Rb,then
FCMPGT.S1    S5,Rc,Rb,then
FCMPGT.S2    S6,Re,Rb,then
FCMPGT.S3    R7,Rg,Rb,then
SADD.Q0123   R4,R6,R8
SMUL.Q0123   R5,R7,R9
FSUB.H01     R10,R12,R14
FSUB.H23     R11,R13,R15
FMAD.S0      R16,R20,R24,R28
FMAD.S1      R17,R21,R25,R29
FMAD.S2      R18,R22,R26,R30
FMAD.S3      R19,R23,R27,R31
~
ELSE         S4
~
ENDIF        S4
```

In one example embodiment, as shown above, four single precision floating point compare instructions set up four executions masks 1010 that are used simultaneously to control the four different units of work. In one example embodiment, the computations come in several sizes; integer signed quarter precision, floating point half precision, and floating point single precision. In the example, each single precision unit of work is expressed as one instruction. In one embodiment, two half precision computations are expressed as one instruction. In one embodiment, four quarter precision computations are expressed as one instruction. Looked at differently, the four quarter precision units of work have been compressed into a single instruction; and the four half precision units of work have been compressed as two half precision instructions. In one embodiment, each unit of work is controlled by a single unique bit in the execution mask 1010 (FIG. 10).

In one embodiment, logical computations are used to express the logical AND and the logical OR constructs of shader languages. In source code, one would see the double ampersand (&&) or the double vertical (||). In one embodiment, the Logical AND construct has the property that the first clause that fails causes no further instructions to be processed. In one example embodiment, this fits perfectly with the lane control compare instructions that can be exercised. Thus, the logical AND construct is straightforward; the compiler emits another compare instruction and masks off lanes of execution:

```
if( a > b && i < k )    FCMPGT    s4,Ra,Rb,andand
{                       ICMPGE    s4,Ri,Rk,andthen
~
}
else                    ELSE      s4    // from then to else
clause
{
~
}                       ENDIF     s4    // exit if-the-else
~
```

In one embodiment, the Logical OR construct is the contra-positive of the Logical AND. In one embodiment, the first clause that succeeds causes the rest of the instructions to be bypassed, but at the entry to the "THEN" clause, those threads are reactivated. These actions are performed as illustrated in the following snippet of code:

```
if( a > b || i < k || x == y )
        FCMPGT    s4,Ra,Rb,firstor
        ICMPLT    s4,Ri,Rk,oror
{       FCMPEQ    s4,Rx,Ry,orthen
~
}
else    ELSE      s4    // from then to else
clause
{
~
}       ENDIF     s4    // exit if-the-else
~
```

In one embodiment, flow control extends the concepts of Lane Execution Control in order to support loop constructs expressed in shader languages. All shader languages express loops in reducible form. In one embodiment, loops expressed in reducible programming languages have a backward branch to transfer control to the top of a loop. In one embodiment, there are several ways to leave a loop body, for example, by the loop control point itself, and with the break concept of the shader languages. Units of work that leave the loop are accumulated in a scalar register. In one embodiment, there is an additional concept that skips subsequent instructions in the loop but those lanes get turned back on by the time the top of the loop is reached. This concept is manifest in the continue construct of shader languages. Only when all threads have left the loop body does control not transfer back to the top of the loop, and at which time, all the threads that left the loop rejoin execution by setting execution mask bits from the accumulating scalar register.

For completeness, a branch may be forward or backwards. Backward branches in shader programs are primarily for looping, while forward branches are for large scale control transfer. Backward branches are taken if any thread is still executing. Forward branches are taken if there are no threads still executing. In one embodiment, the above-mentioned paradigm is an effect of using one program counter for a multiplicity of threads (the WARP) in the SIMT programming model environment. One or more embodiments provide skipping instructions by means of manipulating execution mask bits with compare and label instructions.

A simple loop corresponds to the FOR-LOOP, the DO-WHILE-LOOP, and the WHILE-DO-LOOP constructs of shader programming languages. The FOR-LOOP and the WHILE-DO-LOOP check for loop exit at the top of the loop, while the DO-WHILE-LOOP checks for loop exit at the bottom. A compiler may examine the FOR-LOOP and statically decide to express the loop in bottom checking form (or not). There are three control points in a loop; the top of the loop, the continue point of the loop, and the exit point of the loop. At the end of the loop there will be a backwards branch instruction to the top of the loop. If the loop is bottom checking there are instructions immediately preceding the branch instruction that governs whether to take the branch or not. If the loop is top checking the code that decides to execute the loop resides at the top of the loop which is also the target of the branch instruction.

In one embodiment, the backward branch instruction is defined to transfer control to the supplied instruction if any threads remain active. In one example embodiment, if no threads remain active, the backwards branch instruction restores the Execution Mask from the accumulating Scalar register. The following code snippet illustrates the semantic action of the backwards branch instruction:

```
if( EM != 0 )
    PC = Label
else
    EM = Sn
```

The compare instruction which governs execution is used with the loop construct (rather than the "THEN" construct used in IF-THEN-ELSE programming). In one embodiment, a scalar register 1030 is used to accumulate the threads which have left the loop so that when the execution mask 1010 (FIG. 10) has become empty, the branch instruction to the top of the loop will not be taken and the execution mask 1010 is restored from the scalar register 1030. In one embodiment, a backwards branch (BBR) instruction is in the class of instructions that activate inactive work units:

```
for( i = 0; i < m ; i++ )
{
    body
}
```

Which may be expressed as follows:

```
        MOV      Ri,0
        CMPLT    S4,Ri,Rm,then

LOOP:

body
        IADD     Ri,Ri,1
        CMPLT    S4,Ri,Rm,loop
        BBR      S4,LOOP
```

In one embodiment, the compiler for the architecture 400/1000 converted the top checking loop into a top and bottom checking loop. In one embodiment, the conversion prevents an unnecessary pass over the loop body with no lanes being active. The compare instructions use the loop construct. In one embodiment, when the compare has determined which lanes are still active, it accumulates the lanes that have left the loop into the scalar register 1030.

In one embodiment, when a thread is to leave a loop at a point other than the loop control statement, it may use the break construct. The threads that execute the break quit executing instructions within the loop, but rejoin the other threads immediately after the loop terminates. Since the breaking threads will not be active again until the loop exits, the break uses the same scalar register as the loop. In one embodiment, at the BBR instruction point of the loop the specified scalar register is used to turn lanes back on that executed the break construct. In one example embodiment, the following code snippets illustrate the concept:

```
for( i = 0; i < m ; i++ )
{
    body
    if( x > y )
        break;
    more-body
}
``` which can be expressed as follows:

```
        MOV     Ri,0
        CMPLT   S4,Ri,Rm,loop
LOOP:
    body
    FCMPLT  S4,Rx,Ry,break  // the compare and break
    more-body
    IADD    Ri,Ri,1
    CMPLT   S4,Ri,Rm,loop
    BBR     S4,LOOP
```

In one embodiment, when a thread is to execute no more instructions within this pass of the loop body, it may use the continue construct. The threads that execute the continue quit executing instructions in the loop, but rejoin the loop immediately prior to the bottom checking loop code. In one embodiment, these continue threads are managed by a different scalar register than the loop. In one example embodiment, the following code snippets illustrate the concept:

```
for( i = 0; i < m ; i++ )
{
    body
    if( x > y )
        continue;
    more-body
}
``` which can be expressed as follows:

```
        MOV     Ri,0
        CMPLT   S4,Ri,Rm,loop
LOOP:
    body
    FCMPLE  S8,Rx,Ry,cont   // the compare and continue
    more-body
    CONT    S8              // continue
    IADD    Ri,Ri,1
    CMPLT   S4,Ri,Rm,loop
    BBR     S4,LOOP
```

The CONT instruction is a member of the LABEL instruction group. In one embodiment, it is expected that CONT instruction and the last instruction of more-body will run concurrently, CONT appearing to take zero execution time. It is important to recognize that the scalar register managing the loop is distinct from the scalar register managing the continue. In one embodiment, the existence of both break and continue are illustrated in the following snippet of code:

```
for( i = 0; i < m ; i++ )
{
    body
    if( x > y ) continue;
    more-body
    if( x < b ) break;
    still-more-body
}
``` which can be expressed as follows:

```
        MOV     Ri,0
        CMPLT   S4,Ri,Rm,loop
LOOP:
    body
    FCMPGT  S8,Rx,Ry,cont   // the compare and continue
    more-body
    FCMPLT  S4,Rx,Rb,break  // break out of the loop
    CONT    S8              // continue
    IADD    Ri,Ri,1
    CMPLT   S4,Ri,Rm,loop
    BBR     S4,LOOP.
```

In one embodiment, the continue threads will wake back up at the CONT instruction while the break threads will not wake back up until the BBR is not taken. In one embodiment, these concepts are managed by distinct scalar registers.

Figure 14:
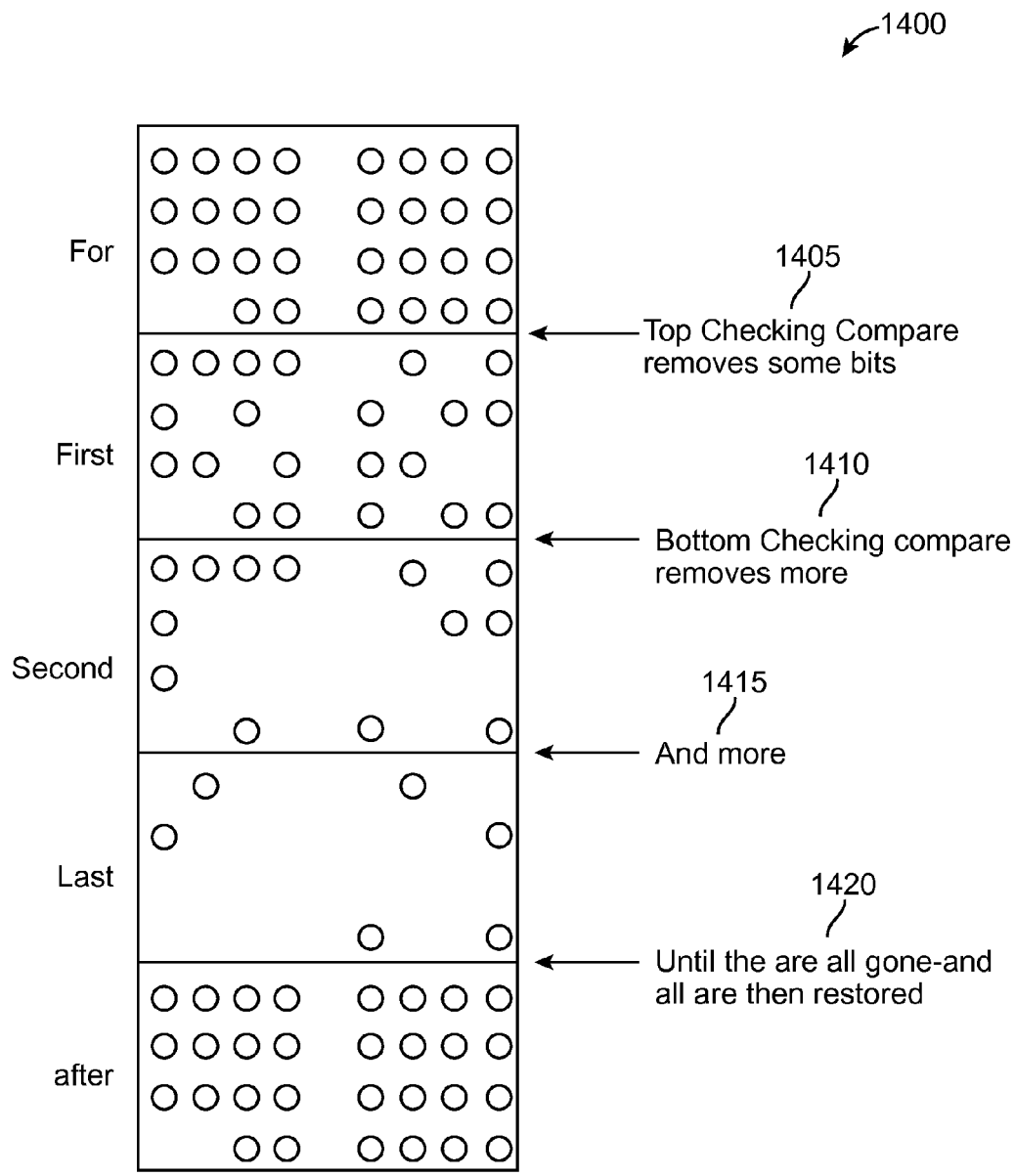
FIG. 14 shows an example representation for a loop construct, according to an embodiment.

FIG. 14 shows an example representation 1400 for a WARP performing a loop construct, according to an embodiment. In one embodiment, in the representation 1400, the top checking compare 1405 removes bits, the bottom checking compare 1410 removes more bits, the next compare 1415 removes more bits, etc. until all the bits are removed, and then the after representation 1420 restores the execution mask bits.

Figure 15:
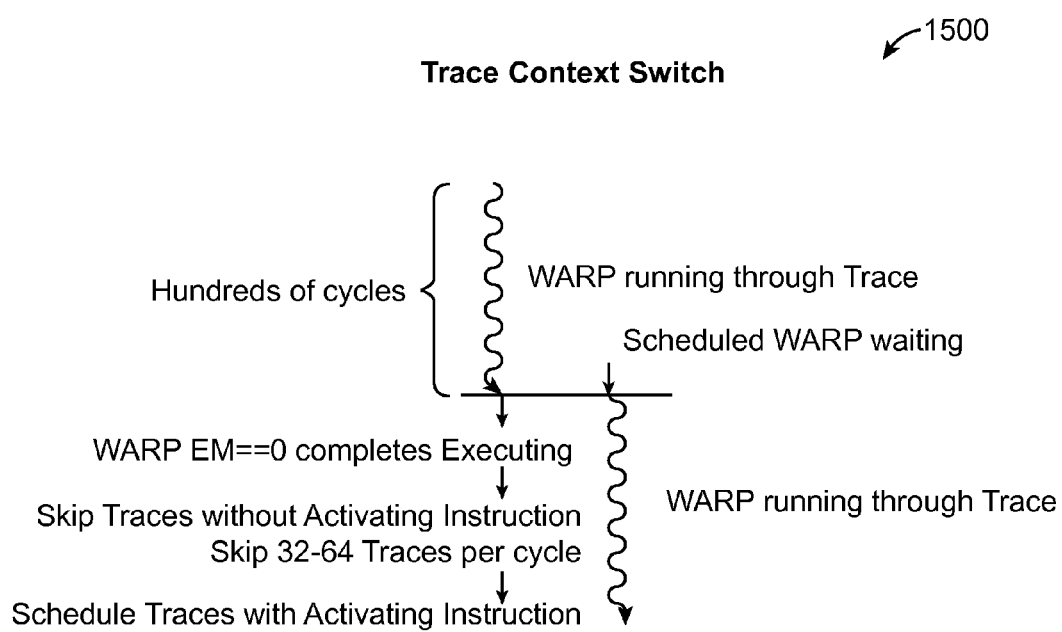
FIG. 15 shows an example representation for a trace context switch, according to an embodiment.

FIG. 15 shows an example depiction of a trace context switch and general execution flow 1500, according to an embodiment.

In one embodiment, a switch statement is expressed by a code sequence wherein each thread decides which label in the switch is the correct execution point. In one example embodiment, the address of this label is stored in the register, and then the execution mask 1010 (FIG. 10) is cleared. In one embodiment, at this point the instruction store 410 (FIG. 4) skips forward to the first and closest JOIN instruction and it is executed as the next instruction. In one embodiment, each effective label in the switch statement has a JOINx instruction. In one embodiment, when the control point passes the JOINx instruction, threads wanting to arrive at this label are turned on and begin executing again. In one embodiment, there is an exclusive JOINX instruction that inactivates active threads and potentially activates inactive units of work, and there is an inclusive JOINI instruction that potentially activates inactive threads, only. These ideas are illustrated in the following un-optimized code snippet:

```
         // register Ri contains the switch value
switch ( i )   MOV     Rs,EM
               MOV     EM,0
{
case 2:        JOIN    Ri,2
    break;     OR      Rs,EM
               MOV     EM,0
case 14:       JOIN    Ri,14      // case with break
case 92:       JOIN    Ri,92      // case without
break
}              MOV     EM,Rs
``` and the optimized code snippet:

```
         // register Ri contains the switch value
switch ( i )
{
case 2:        JOINX   Ri,2,Rs
    break;
case 14:       JOINX   Ri,14,Rs   // case with break
case 92:       JOINI   Ri,92,Rs   // case without break
}              MOV     EM,Rs
```

The forward branch is used to actually transfer control over large groups of instructions, whereas execution mask 1010 (FIG. 10) manipulation is used to skip over small groups of instructions on a thread by thread basis. In one embodiment, anytime there is no execution mask 1010 bits enabled, threads at the current program counter arrive at the lowest (first) point forward in the shader program for which a thread can be reactivated. In one embodiment, the point in time where the branch is taken and the label to which control is transferred is dependent on the data in the threads not on the instructions in the shader program.

The forward branch may span multiple Trace boundaries. Thus, the forward branch needs a way to associate the threads that leave the current WARP with the threads to reactivate upon arrival at the label of the forward branch instruction. The thread register file provides storage, and a special compare instruction (JOINI) provides the association. In one embodiment, when a forward branch is taken, the threads that take the branch are removed from the execution mask 1010 (FIG. 10), and the label of the branch is written into the destination register of those threads.

In one embodiment, at the label of each forward branch is a JOINI instruction. A JOINI instruction is a compare instruction that executes inactive work units hoping to activate them. In one embodiment, if the comparison succeeds, the associated execution mask 1010 bits are activated. Without loss of generality, in one embodiment what remains is a means to find the minimum program counter when the execution mask 1010 is empty. That is when all lanes have left execution, instead of cruising through the shader program one instruction at a time waiting to run into a JOINI instruction, control is transferred directly to the label instruction which would have been encountered first.

In one embodiment, the Shader (e.g., 600, FIGS. 6-7) contains a table of traces 650, and associated with this table of traces 650 is an activate bit-vector or activating search table 710. In one embodiment, when a WARP leaves a trace 650 and execution mask 1010 (FIG. 10) is empty, the WARP scheduler will use a Find-First One circuit to rapidly scan forward for the next trace that contains an activating instruction (that is an instruction which will activate inactive threads). Without loss of generality, in one embodiment the WARP scheduler is able to skip forward 32 (or 64) traces 650 per WARP scheduler cycle. In one embodiment, rapidly finding the trace 650 which contains an activating instruction which may enable inactive threads.

In one embodiment, when the execution mask 1010 becomes empty, meaning that no non-activating instructions will execute, the processor enters a special mode and skips all instructions that do not have the chance of activating one or more units of work. In one embodiment, the instruction store 410 (FIG. 4) assists in the scan from the point where execution mask 1010 became empty with limited horizon, skipping all instructions other than activate instructions. There is a fast Find-First circuit in the instruction store 410 that finds the first activate instruction between instruction execution cycles. In one embodiment, in order to transfer control, the instruction counter of a WARP is set to the output of the find-first circuit.

In one embodiment, within a trace 650 this search is optimized by a find-first "1" circuit attached to the instruction store 410 where the instruction pipeline 410 may skip any number of instructions in a trace 650 between instruction execution cycles (when execution mask 1010=0). In one embodiment, between traces 650, the WARP scheduler applies a similar find-first "1" circuit to skip a multiplicity of traces 650 that do not contain activating instructions (indicated as "1") in the bit-vector or activating search table 710. In one embodiment, when an activating instruction activates a unit of work, the processing element of the GPU reverts back to normal operations. In one embodiment, if the end of the shader program is reached without any active units of work, the Graphics Pipeline control is alerted and will dispose of the threads as required.

In one example embodiment, once a trace 650 (FIG. 6) is scheduled, the WARP scheduler loads the instructions of the trace 650 into the instruction store 410 (FIG. 4). In one embodiment, the loading may take place while another WARP is already executing instructions from another section of the instruction store 410. In one embodiment, when the executing WARP reaches the end of its trace 650, the processing element 400 switches to the scheduled WARP and begins execution. In one embodiment, this WARP switch may take place between instruction execution so the last instruction of one WARP is immediately followed by the first execution of the scheduled WARP, as illustrated in the example execution flow 1500.

In one embodiment, instructions are fetched from the instruction store 410 over the instruction pipeline of the processing element 400 and provide the data path control signals to orchestrate the desired computation. Data is fetched from the register file 420 and the (register) tunnel file are merged with just computed data. In one embodiment, after computation has completed, result data is available to be forwarded to subsequent instructions 660-661 immediately, written into the tunnel file, or written back to the register file 420. In one embodiment, the tunnel file is not persistent across a trace 650 boundary.

FIG. 16 shows an example block diagram of a graphics pipeline 1600 for a graphics processor or GPU, according to an embodiment. Without loss of generality, in one embodiment a shader core comprises of 4 processing element 400 (FIG. 4) pairs and a number of fixed function units. In one embodiment, some of the fixed function units (e.g., the Load Store) are distributed with the processing element 400 pairs, while others such as Texture and Interpolation are centralized. In one example embodiment, many of the fixed function units are illustrated in the example pipeline 1600 along with pertinent conceptual data-flow. In one example embodiment, from the viewpoint of the processing element 400, there are a plurality busses that allow the processing element 400 to interact with the rest of the graphics pipeline 1600.

In one embodiment, the pipeline 1600 includes one or more 256-bit result plus 32-bits enable busses. In one embodiment, the busses serves to deliver results to the next stage of the graphics pipeline 1600 through the EMIT unit, to deliver addresses to the load store unit, to deliver texture coordinates to the Texture Coordinate Buffer, and to deliver offset data to the interpolator for interpolation. In one embodiment, the pipeline 1600 includes another 256-bit Load plus a 32-bit enable bus. The enable bus serves to deliver Load data, Texture results, Interpolation results, and Initialization data into the register file 420. In one embodiment, attached to the enable bus, and running two cycles earlier is a Load address bus which delivers the 9-bit register address to the loop buffer 410 and 32-write enable bits to the register file 420.

In one embodiment, the pipeline 1600 includes another 256-bit Store Data plus a 32-bit enable bus. In one embodiment, this enable bus delivers register read data to the Load Store Unit. In one embodiment, attached to the enable bus and running two cycles earlier is the store address bus. Without loss of generality, in one embodiment the protocol on the enable bus is to send the address on the pipeline beat, two cycles later there will be a signal indicating if data will be arriving in the subsequent cycle and persisting for 4 beats of the pipeline.

Without loss of generality, in one embodiment the pipeline 1600 includes a 64-bit instruction bus. In one embodiment, the instruction bus delivers instruction bit patterns and relocated register addresses to the Load Store, Texture, and Interpolator.

Without loss of generality, in one embodiment draw commands enter the pipeline 1600 from the graphics driver (or optionally from a command processor). In one example embodiment, associated with a draw command is a graphics state (GS) (the current state of the OpenGL state machine for a pipeline implementing the OpenGL API). In one embodiment, the Rasterizer is handed a Primitive in the beginning of the pipeline 1600 flow. In one embodiment, the Rasterizer determines if the primitive is in the current Tile, and if so, it sets up the Plane Equation Table (PET) for Setup, then proceeds to spew out Quads of pixels into the Interpolator coordinate buffer.

In one embodiment, the Interpolator uses the Plane Equation Tables for each Quad and interpolates the coordinate of the quads into frame coordinate space. The result may be delivered directly to the texture unit Texture Coordinate Buffer or it may be delivered to the Register File 420 of a processing element 400 (FIG. 4) through the Load Store Unit. In one embodiment, the Texture Unit uses coordinates stored in the Texture Coordinate Buffer and processes textured Quads under control of SAMPLE instructions.

In one embodiment, the WARP constructors 1605 are in charge of allocating and building WARPs for processing. In one embodiment, this process consists of allocating a WARP, associating a Register File 420 with that WARP, filling the Register File 420 with initialization data and signaling the WARP manager 1630 to start this WARP into execution. The Load Store Unit performs memory reference instructions, and provides an interface between other fixed function units and the Register Files 420. In one embodiment, the WARP manager 1630, Register File 420 and Computation Unit comprise the processing element 400 (FIG. 4) including the Loop Buffer 410.

In one embodiment, the EMIT unit routes data emitted from shader programs 1610 and 1620 down the graphics pipeline 1600 to the next stage of processing (ROP or as inputs to the next WAARP constructor).

In one embodiment, the Clip Cull and Viewport (CCV) unit (not shown) of the pipeline 1600 builds an intermediate representation of fully processed primitives that will be processed by the Rasterizer. In one embodiment, the ROP unit (not shown) takes the computed, textured Quads and integrates their data into the frame buffer.

In one embodiment, a graphics processing slice consists of eight processing elements 400 (FIG. 4), a number of fixed function units, and an interface to the GPU network. In one embodiment, the GPU delivers a batch of work to the graphics processing slice. The graphics processing slice parses the work into WARP sized bundles, initializes the graphics pipeline 1600 and shader programs, and assigns units of work to WARP threads which will run on processing elements 400. It should be noted that the example pipeline 1600 is illustrative and provides a guide as how data is routed around the graphics processing slice.

In one embodiment, the register file 420 of a WARP is controlled by the base offset contained within the WARP data structure. In one embodiment, a register in an instruction is mapped into the Register File 420 by adding the base shifted up by 2 bits in the WARP to the register in the instruction. In one embodiment, register relocation is performed by a 6-bit adder. In one embodiment, a register address presented to centralized fixed function units contains a Processing Element Number, a Register File bit, and a relocated register address. In one example embodiment, the low order 2 bits of the register address select the SRAM bank. In one embodiment, the Processing element number routes the request to the register file 420 of the appropriate processing element 400 while the Register File bit selects between a thread Register File access or a Scalar Register File access.

Figure 17:
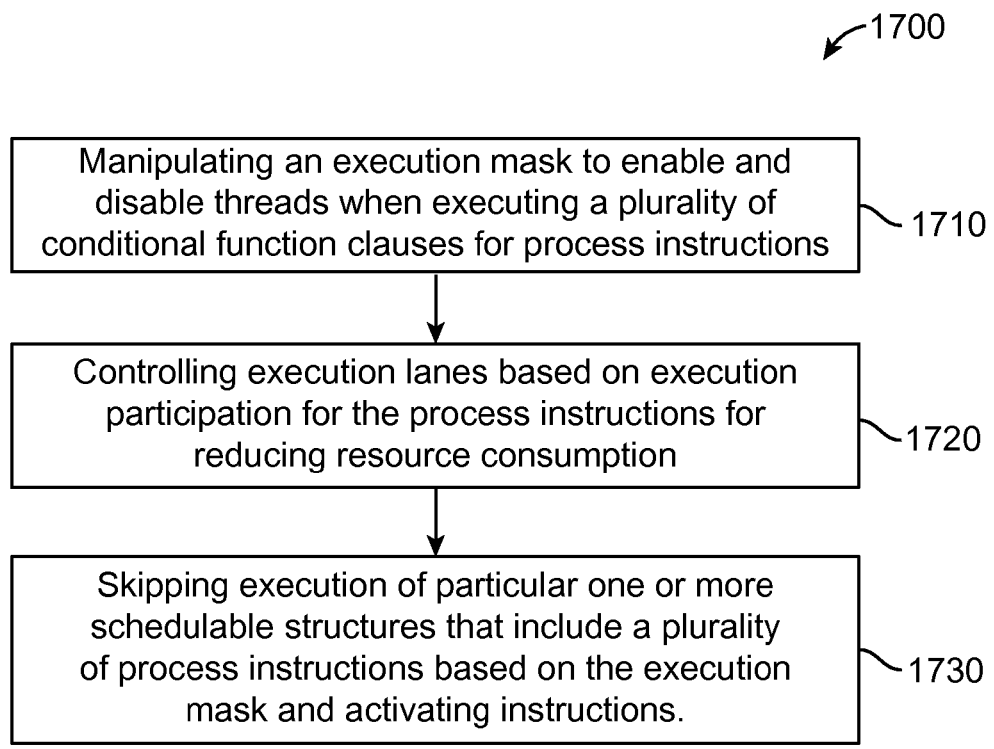
FIG. 17 shows block diagram for a process for controlling execution flow in a thread-based environment, according to one embodiment.

FIG. 17 shows a block diagram for a process 1700 for controlling execution for resource savings (e.g., processor usage, memory usage, power usage, etc.) in a thread processing environment for a GPU (e.g., a GPU of GPU module 129, FIG. 2), according to one embodiment. In one embodiment, in block 1710 an execution mask (e.g., execution mask 1010, FIG. 10) is manipulated to enable and disable threads when executing a multiple conditional function clauses for process instructions (e.g., instructions 660-661, FIG. 6). In one embodiment, in block 1720 execution lanes (e.g., 401/402, FIG. 4) are controlled based on execution participation for the process instructions for resource consumption. In one embodiment, in block 1730 execution of particular one or more schedulable structures (e.g., shader 600, FIG. 5, with traces 650, FIG. 6) that include multiple process instructions are skipped based on the execution mask and activating instructions.

In one embodiment, in process 1700, the conditional function clauses comprise a set of instructions in an instruction set architecture of the thread-based environment. In one embodiment, the thread-based environment comprises a SIMT processing architecture, and the set of instructions directly implement semantics of high-level programming constructs by manipulating the execution mask and controlling the execution lanes to reduce resource consumption.

In one embodiment, in process 1700, the set of instructions effect small scale control flow without using a program counter, and one or more of the process instructions are preprocessed for reducing execution time. In one embodiment, the multiple conditional function clauses comprise comparison functions for directing different sets of threads through different conditional function clauses by manipulating the execution mask to enable and disable threads when executing the conditional function clauses for the threads.

In one embodiment, process 1700 further includes executing particular process instructions, based on the execution mask, concurrently with a last instruction of a previous conditional function clause for reducing execution time. In one embodiment, using a scalar register (e.g., scalar register 1030, FIG. 10) for holding one or more of information for: bit-vectors, bit-patterns, execution lanes and threads that have been removed for restoring the execution mask, turning on all execution lanes when exiting, and avoiding branching to a top of a loop if process instructions involve a loop.

In one embodiment, process 1700 further includes reducing power consumption of execution lanes that are not participating in execution of a particular process instruction by preventing: reading registers from a register file, shipping the registers to a computation unit, computing unnecessary results, shipping results back to the register file, writing data into the register file, and raising exceptions or faults.

In one embodiment, in process 1700 skipping execution of the particular one or more schedulable structures comprises using a find-first circuit for skipping over and skipping past all of the particular one or more schedulable structures that do not have activation instructions (e.g., in an activate bit-vector or activating search table 710, FIG. 7) and all the process instructions within the one or more particular schedulable structures other than activation instructions when the execution mask includes all zeros. In one embodiment, the process instructions comprise shader core instructions. In one embodiment, in process 1700 the GPU is employed by an electronic device (e.g., electronic device 120, FIG. 2).

Figure 18:
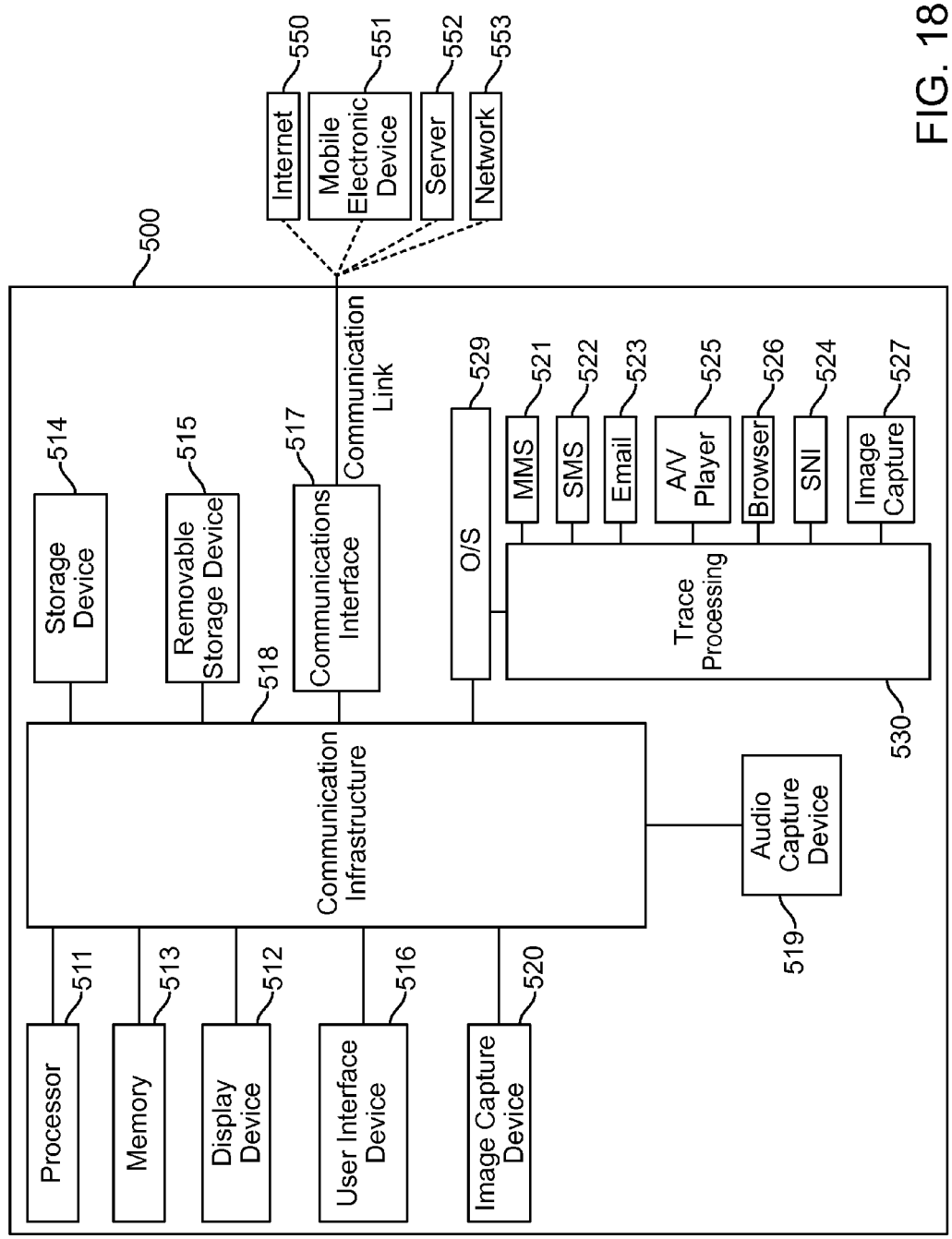
FIG. 18 is a high-level block diagram showing an information processing system comprising a computing system implementing one or more embodiments.

FIG. 18 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a trace processing module 530 that may implement processing similar as described regarding shader 600 and trace 650 (FIGS. 6-9), the processing structure 400 (FIG. 4) and 1000 (FIG. 10), and pipeline 1600 (FIG. 16). In one embodiment, the trace processing module 530 may implement the process of flowchart 1700 (FIG. 17). In one embodiment, the trace processing module 530 along with an operating system 529 may be implemented as executable code residing in a memory of the system 500. In another embodiment, the trace processing module 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for computing in a thread-based environment that includes a single instruction multiple threads (SIMT) processing architecture, the method comprising:
    manipulating an execution mask to enable and disable one or more threads in response to executing a plurality of conditional function clauses for one or more process instructions, wherein the conditional function clauses include a set of instructions in an instruction set architecture of the thread-based environment, and wherein the set of instructions effect control flow in the SIMT processing architecture without executing one or more control flow transfer instructions, and at least one of the process instructions are preprocessed for reducing execution time;
    reducing resource consumption of the thread-based environment by controlling one or more execution lanes based on whether the one or more execution lanes participate in execution of the one or more process instructions; and
    skipping execution of one or more schedulable structures comprising a plurality of process instructions based on the execution mask and one or more activating instructions that enable threads by manipulating the execution mask.

2. The method of claim 1, wherein the set of instructions directly implement one or more semantics of one or more programming languages by manipulating the execution mask and controlling the execution lanes to reduce the resource consumption of the execution lanes, and the resource consumption comprises power usage.

3. The method of claim 2, further comprising:
    using a scalar register for holding one or more of information for: one or more bit-vectors, one or more bit-patterns, at least one of the execution lanes and at least one of the threads that have been removed for restoring the execution mask, turning on all the execution lanes in response to exiting, and avoiding branching to a top of a loop if the process instructions involve a loop.

4. The method of claim 3, further comprising:
    reducing power consumption of at least one of the execution lanes that is not participating in execution of at least one of the process instruction by preventing: reading one or more registers from a register file, shipping the registers to a computation unit, computing one or more unnecessary results, shipping one or more results back to the register file, writing data into the register file, and raising one or more exceptions or faults.

5. The method of claim 4, wherein skipping execution of one or more schedulable structures comprises:
    determining whether the execution mask includes all zeros; and
    in response to determining the execution mask includes all zeros, using a find-first circuit for skipping over and skipping past all of the schedulable structures that do not have the activating instructions and all the process instructions within the schedulable structures other than the activating instructions.

6. The method of claim 5, wherein the process instructions comprise at least one shader core instruction.

7. The method of claim 2, wherein the thread-based environment is for a graphical processing unit (GPU).

8. The method of claim 7, wherein the GPU is employed by an electronic device.

9. The method of claim 1, wherein the plurality of conditional function clauses comprises one or more comparison functions for directing different sets of threads through different conditional function clauses by manipulating the execution mask to enable and disable the different sets of threads.

10. The method of claim 9, further comprising:
    executing at least one of the process instructions, based on the execution mask, concurrently with a last instruction of a previous conditional function clause for reducing execution time.

11. A non-transitory computer-readable medium having instructions which, when executed on a computer, perform a method comprising:
    manipulating an execution mask to enable and disable one or more threads in response to executing a plurality of conditional function clauses for one or more process instructions, wherein the conditional function clauses include a set of instructions in an instruction set architecture of a thread-based environment, and wherein the set of instructions effect control flow in a single instruction multiple threads (SIMT) processing architecture without executing one or more control flow transfer instructions, and at least one of the process instructions are preprocessed for reducing execution time;
    reducing resource consumption of the thread-based environment by controlling one or more execution lanes based on whether the one or more execution lanes participate in execution of the one or more process instructions; and
    skipping execution of one or more schedulable structures comprising a plurality of process instructions based on the execution mask and one or more activating instructions that enable threads by manipulating the execution mask.

12. The medium of claim 11, wherein the set of instructions directly implement one or more semantics of one or more programming languages by manipulating the execution mask and controlling the execution lanes to reduce the resource consumption of the execution lanes, and the resource consumption comprises power usage.

13. The medium of claim 12, wherein the thread-based environment is for a graphical processing unit (GPU), and the GPU is employed by an electronic device.

14. The medium of claim 11, wherein the plurality of conditional function clauses comprises one or more comparison functions for directing different sets of threads through different conditional function clauses by manipulating the execution mask to enable and disable the different sets of threads.

15. The medium of claim 14, further comprising:
executing at least one of the process instructions, based on the execution mask, concurrently with a last instruction of a previous conditional function clause for reducing execution time.

16. The medium of claim 11, further comprising:
using a scalar register for holding one or more of information for: one or more bit-vectors, one or more bit-patterns, at least one of the execution lanes and at least one of the threads that have been removed for restoring the execution mask, turning on all the execution lanes in response to exiting, and avoiding branching to a top of a loop if the process instructions involve a loop.

17. The medium of claim 16, further comprising:
reducing power consumption of at least one of the execution lanes that is not participating in execution of at least one of the process instruction by preventing: reading one or more registers from a register file, shipping the registers to a computation unit, computing one or more unnecessary results, shipping one or more results back to the register file, writing data into the register file, and raising one or more exceptions or faults.

18. The medium of claim 17, wherein skipping execution of one or more schedulable structures comprises:
determining whether the execution mask includes all zeros; and
in response to determining the execution mask includes all zeros, using a find-first circuit for skipping over and skipping past all of the schedulable structures that do not have the activating instructions and all the process instructions within the schedulable structures other than the activating instructions.

19. A graphics processor for an electronic device comprising:
one or more processing elements coupled to a memory device storing instructions that when executed by the processing elements causes the processing elements to perform operations comprising:
manipulating an execution mask to enable and disable one or more threads in response to executing a plurality of conditional function clauses for one or more process instructions, wherein the plurality of conditional function clauses include a set of instructions in an instruction set architecture of a single instruction multiple thread (SIMT) processing architecture, and wherein the set of instructions effect control flow in the SIMT processing architecture without executing one or more control flow transfer instructions, at least one of the process instructions are preprocessed for reducing execution time;
reducing resource consumption of a thread-based environment by controlling one or more execution lanes based on whether the one or more execution lanes participate in execution of the one or more process instructions; and
skipping execution of one or more schedulable structures comprising a plurality of process instructions based on the execution mask and one or more activating instructions that enable threads by manipulating the execution mask.

20. The graphics processor of claim 19, wherein the set of instructions directly implement one or more semantics of one or more programming languages by manipulating the execution mask and controlling the execution lanes to reduce the resource consumption of the execution lanes, and the resource consumption comprises power usage.

21. The graphics processor of claim 20 wherein the plurality of conditional function clauses comprise one or more comparison functions for directing different sets of threads through different conditional function clauses by manipulating the execution mask to enable and disable the different sets of threads.

22. The graphics processor of claim 21, wherein the operations further comprise:
executing at least one of the process instructions, based on the execution mask, concurrently with a last instruction of a previous conditional function clause for reducing execution time.

23. The graphics processor of claim 22, wherein the operations further comprise:
using a scalar register for holding one or more of information for: one or more bit-vectors, one or more bit-patterns, at least one of the execution lanes and at least one of the threads that have been removed for restoring the execution mask, turning on all the execution lanes in response to exiting, and avoiding branching to a top of a loop if the process instructions involve a loop.

24. The graphics processor of claim 23, wherein the operations further comprise:
reducing power consumption of at least one of the execution lanes that is not participating in execution of at least one of the process instruction by preventing: reading one or more registers from a register file, shipping the registers to a computation unit, computing one or more unnecessary results, shipping one or more results back to the register file, writing data into the register file, and raising one or more exceptions or faults.

25. The graphics processor of claim 24, wherein skipping execution of one or more schedulable structures comprises:
determining whether the execution mask includes all zeros; and
in response to determining the execution mask includes all zeros, using a find-first circuit for skipping over and skipping past all of the schedulable structures that do not have the activating instructions and all the process instructions within the schedulable structures other than the activating instructions.

26. The graphics processor of claim 19, wherein the graphics processor is part of a graphical processing unit (GPU) that uses the single instruction multiple threads (SIMT) processing architecture.

27. The graphics processor of claim 19, wherein the electronic device comprises a mobile electronic device.

* * * * *